United States Patent
Deogun et al.

(10) Patent No.: US 11,457,376 B2
(45) Date of Patent: Sep. 27, 2022

(54) ROBUST RADIO LINK MONITORING FRAMEWORK FOR UNLICENSED SPECTRUM

(71) Applicant: QUALCOMM Incorporated, San Diego, CA (US)

(72) Inventors: Pravjyot Singh Deogun, Bengaluru (IN); Xiaoxia Zhang, San Diego, CA (US); Ozcan Ozturk, San Diego, CA (US); Jing Sun, San Diego, CA (US); Kapil Bhattad, Bangalore (IN); Ananta Narayanan Thyagarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 16/777,618

(22) Filed: Jan. 30, 2020

(65) Prior Publication Data
US 2020/0252821 A1    Aug. 6, 2020

(30) Foreign Application Priority Data

Feb. 1, 2019  (IN) .............................. 201941004074

(51) Int. Cl.
H04W 24/10 (2009.01)
H04W 72/04 (2009.01)
H04W 16/14 (2009.01)

(52) U.S. Cl.
CPC ........... H04W 24/10 (2013.01); H04W 16/14 (2013.01); H04W 72/042 (2013.01); H04W 72/0453 (2013.01)

(58) Field of Classification Search
CPC ... H04W 24/10; H04W 16/14; H04W 72/042; H04W 72/0453; H04W 76/27; H04W 74/04; H04W 76/19
See application file for complete search history.

(56) References Cited

U.S. PATENT DOCUMENTS 10,743,326 B2 *  8/2020  da Silva .............. H04W 56/001
11,197,179 B2 * 12/2021  Pao ....................... H04W 52/00
(Continued)

OTHER PUBLICATIONS

Ericsson: "Inter-RAT RRM Measurements for NR and LTE," 3GPP Draft, 3GPP TSG-RAN WG2 #98, R2-1705430—IRAT RRM Measurements, 3rd Generation Partnership Project (3GPP), Mobile Competence Centre, 650, Route Des Lucioles, F-06921, Sophia-Antipolis Cedex, France, vol. RAN WG2, No. HangZhou, China; May 15, 2017-May 19, 2017, May 14, 2017 (May 14, 2017), XP051275826, 4 pages, Retrieved from the Internet: URL:http://www.3gpp.org/ftp/Meetings_3GPP_SYNC/RAN2/Docs/ [retrieved on Nay 14, 2017], p. 3.

(Continued)

*Primary Examiner* — Brian T O Connor
(74) *Attorney, Agent, or Firm* — Liem T. Do

(57) ABSTRACT

Design of robust radio link monitoring framework for unlicensed spectrum is disclosed. The network may configured two different types of radio link monitoring (RLM) reference signal (RS) resources: default resources, which are transmitted throughout a connection, and additional resources, which may be transmitted only when there has been failure of transmission or reception of the default resources. Various criteria may be used by the network to trigger scheduling transmission of the additional RLM-RS. Moreover, different criteria may prompt a user equipment (UE) to begin monitoring the additional RLM-RS resources, including autonomous and network-initiated criteria.

30 Claims, 20 Drawing Sheets

(56) References Cited

U.S. PATENT DOCUMENTS

| | | | | |
|---|---|---|---|---|
| 11,197,231 | B2* | 12/2021 | Amuru | H04L 1/1835 |
| 11,218,280 | B2* | 1/2022 | Futaki | H04W 56/001 |
| 2018/0184362 | A1* | 6/2018 | Babaei | H04W 48/12 |
| 2018/0279145 | A1* | 9/2018 | Jung | H04W 24/08 |
| 2019/0052379 | A1* | 2/2019 | Lin | H04L 5/0082 |
| 2019/0053127 | A1* | 2/2019 | Jung | H04W 48/08 |
| 2020/0145967 | A1* | 5/2020 | Park | H04W 72/0426 |
| 2020/0305038 | A1* | 9/2020 | Tooher | H04W 36/0069 |
| 2020/0344019 | A1* | 10/2020 | Da Silva | H04L 1/1851 |
| 2021/0051499 | A1* | 2/2021 | Chen | H04L 5/001 |
| 2021/0195675 | A1* | 6/2021 | Park | H04W 88/14 |
| 2021/0243808 | A1* | 8/2021 | Deenoo | H04W 74/0841 |
| 2021/0298000 | A1* | 9/2021 | Park | H04W 72/042 |
| 2021/0321277 | A1* | 10/2021 | Murray | H04L 5/0048 |
| 2022/0007217 | A1* | 1/2022 | Mondal | H04J 11/0069 |
| 2022/0061116 | A1* | 2/2022 | Lim | H04W 76/19 |

OTHER PUBLICATIONS

Interdigital, et al., "Initial Access and Mobility Procedures in NR-U,"3GPP Draft, 3GPP TSG RAN WG1 Ad-hoc Meeting 1901, R1-1900787, 3rd Generation Partnership Project (3GPP), Mobile Competence Centre, 650, Route Des Lucioles, F-06921, Sophia-Antipolis Cedex, France, vol. RAN WG1, No. Taipei, Taiwan; Jan. 21, 2019-Jan. 25, 2019, Jan. 20, 2019 (Jan. 20, 2019), XP051593633, 9 pages, Retrieved from the Internet: URL: http://www.3gpp.org/ftp/Meetings%5F3GPP%5FSYNC/RAN1/Docs/R1%2D1900787%2Ezip[retrieved on Jan. 20, 2019], Section 2.3 RLM.

International Search Report and Written Opinion—PCT/US2020/016269—ISA/EPO—dated May 20, 2020.

Nokia, et al., "CR for Remaining Open Issues in SSB RLM",3GPP Draft, 3GPP TSG-RAN WG4#87, R4-1808525, Revised CR for SSB RLM V3, 3rd Generation Partnership Project (3GPP), Mobile Competence Centre, 650, Route Des Lucioles, F-06921, Sophia-Antipolis Cedex, France, vol. RAN WG4, No. Busan, Korea (Republic of), May 21, 2018-May 25, 2018, May 31, 2018 (May 31, 2018), XP051578624, 5 pages, Retrieved from the Internet: URL:http://www.3gpp.org/ftp/tsg%5Fran/WG4%5FRadio/TSGR4%5F87/Docs/R4%2D1808525%2Ezip [retrieved on May 31, 2018] Section 8.1. 2.1 Introduction.

Nokia, et al., "On the Configuration of BFR Detection and RLM RS(s) [N303]",3GPP Draft, 3GPP TSG-RAN WG2 Meeting #101, R2-1803272, On the Configuration of BFR Detection and RLM RSES, 3rd Generation Partnership Project (3GPP), Mobile Competence Centre, 650, Route Des Lucioles, F-06921, Sophia-Antipolis Cedex, France, vol. RAN WG2, No. Athens, Greece; Feb. 26, 2018-Mar. 2, 2018, Feb. 20, 2018 (Feb. 20, 2018), XP051400764, 9 pages, Retrieved from the Internet: URL: http://www.3gpp.org/ftp/tsg%5Fran/WG2%5FRL2/TSGR2%5F101/Docs/ Retreived on Feb. 20, 2018], Annex—Text proposal for 38.331 on RLM configuration.

NTT Docomo, et al., "Discussion on Requirements of Radio Link Monitoring",3GPP Draft, 3GPP TSG RAN WG4 Meeting AH-1801, R4-1800570, Discussion on Requirements of Radio Link Monitoring Final, 3rd Generation Partnership Project (3GPP), Mobile Competence Centre, 650, Route Des Lucioles, F-06921, Sophia-Antipolis Cedex, France, vol. RAN WG4, No. San Diego, US, Jan. 22, 2018-Jan. 26, 2018, Jan. 15, 2018 (Jan. 15, 2018), XP051388198, 3 pages, Retrieved from the Internet: URL: http://www.3gpp.org/ftp/tsg%5Fran/WG4%5FRadio/TSGR4%5FAHs/TSGR4%5FAH%2D1801/Docs/ [retrieved on Jan. 15, 2018], Section 2, Discussion.

\* cited by examiner

ROBUST RADIO LINK MONITORING FRAMEWORK FOR UNLICENSED SPECTRUM

CROSS-REFERENCE TO RELATED APPLICATIONS

This application claims the benefit of Indian Provisional Patent Application No. 201941004074, entitled, "ROBUST RADIO LINK MONITORING FRAMEWORK FOR UNLICENSED SPECTRUM," filed on Feb. 1, 2019, which is expressly incorporated by reference herein in its entirety.

BACKGROUND

Field

Aspects of the present disclosure relate generally to wireless communication systems, and more particularly, to robust radio link monitoring framework for unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the $3^{rd}$ Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, at a user equipment (UE), radio link monitoring (RLM) configuration information including a set of default RLM resources associated with a connected state of the UE and a set of additional RLM resources associated with one or more pre-defined criteria; monitoring, by the UE, the set of default RLM resources for a default RLM reference signal (RLM-RS) from a serving base station during the connected state, observing, by the UE, a pre-defined criteria of the one or more pre-defined criteria, and monitoring, by the UE in response to the pre-defined criteria, the set of additional RLM resources for an additional RLM-RS.

In an additional aspect of the disclosure, a method of wireless communication includes transmitting, by a base station, RLM configuration information to one or more served UEs, wherein the RLM configuration information includes a set of default RLM resources associated with a connected state of the one or more served UEs and a set of additional RLM resources associated with one or more pre-defined criteria, monitoring, by the base station, for the one or more pre-defined criteria over a first predetermined time, scheduling, by the base station, transmission of additional RLM-RS using the set of additional RLM resources in response to detection of a pre-defined criteria of the one or more pre-defined criteria within the first predetermined time, monitoring, by the base station after the scheduling, for one or more pre-defined recovery criteria over a second predetermined time, and ceasing, by the base station, the scheduling in response to detection of one or more pre-defined recovery criteria within the second predetermined time.

In an additional aspect of the disclosure, a method of wireless communication includes receiving, at a UE, RLM configuration information including a set of default RLM resources associated with a connected state of the UE, monitoring, by the UE, the set of default RLM resources for a default RLM-RS from a serving base station during the connected state, transmitting, by the UE, a failure report to the serving base station in response to detection of one or more pre-defined failure criteria associated with a failure of the UE to receive the default RLM-RS, monitoring, by the UE, for one or more pre-defined recovery criteria associated with acceptable link quality between the UE and the serving base station, and transmitting, by the UE, a recovery report to the serving base station in response to detection of the one or more pre-defined recovery criteria.

In an additional aspect of the disclosure, a method of wireless communication includes transmitting, by a base station, RLM configuration information to one or more served UEs, wherein the RLM configuration information includes a set of default RLM resources associated with a connected state of the one or more served UEs, receiving, by the base station, a failure report from the one or more served UEs, wherein the failure report is associated with a failure of the one or more served UEs to receive a default RLM-RS transmitted by the base station, and receiving, by the base station, a recovery report from the one or more served UEs, wherein the recovery report is associated with an acceptable link quality between the one or more served UEs and the serving base station.

In an additional aspect of the disclosure, a method of wireless communications includes determining, by a UE, an absence of candidate RLM-RS (AR) for each one or more RLM-RS determined to not have been received by the UE over a predetermined period of time, declaring, by the UE, a radio link issue in response to a number of AR exceeding a maximum threshold, and initiating, by the UE, an AR timer at the UE in response to declaration of the radio link issue.

In an additional aspect of the disclosure, an apparatus configured for wireless communication includes means for receiving, at a UE, RLM configuration information including a set of default RLM resources associated with a connected state of the UE and a set of additional RLM resources associated with one or more pre-defined criteria; means for monitoring, by the UE, the set of default RLM resources for a default RLM-RS from a serving base station during the connected state, means for observing, by the UE, a pre-defined criteria of the one or more pre-defined criteria, and means for monitoring, by the UE in response to the pre-defined criteria, the set of additional RLM resources for an additional RLM-RS.

In an additional aspect of the disclosure, an apparatus configured for wireless communication includes means for transmitting, by a base station, RLM configuration information to one or more served UEs, wherein the RLM configuration information includes a set of default RLM resources associated with a connected state of the one or more served UEs and a set of additional RLM resources associated with one or more pre-defined criteria, means for monitoring, by the base station, for the one or more pre-defined criteria over a first predetermined time, means for scheduling, by the base station, transmission of additional RLM-RS using the set of additional RLM resources in response to detection of a pre-defined criteria of the one or more pre-defined criteria within the first predetermined time, means for monitoring, by the base station after the means for scheduling, for one or more pre-defined recovery criteria over a second predetermined time, and means for ceasing, by the base station, the scheduling in response to detection of one or more pre-defined recovery criteria within the second predetermined time.

In an additional aspect of the disclosure, an apparatus configured for wireless communication includes means for receiving, at a UE, RLM configuration information including a set of default RLM resources associated with a connected state of the UE, means for monitoring, by the UE, the set of default RLM resources for a default RLM-RS from a serving base station during the connected state, means for transmitting, by the UE, a failure report to the serving base station in response to detection of one or more pre-defined failure criteria associated with a failure of the UE to receive the default RLM-RS, means for monitoring, by the UE, for one or more pre-defined recovery criteria associated with acceptable link quality between the UE and the serving base station, and means for transmitting, by the UE, a recovery report to the serving base station in response to detection of the one or more pre-defined recovery criteria.

In an additional aspect of the disclosure, an apparatus configured for wireless communication includes means for transmitting, by a base station, RLM configuration information to one or more served UEs, wherein the RLM configuration information includes a set of default RLM resources associated with a connected state of the one or more served UEs, means for receiving, by the base station, a failure report from the one or more served UEs, wherein the failure report is associated with a failure of the one or more served UEs to receive a default RLM-RS transmitted by the base station, and means for receiving, by the base station, a recovery report from the one or more served UEs, wherein the recovery report is associated with an acceptable link quality between the one or more served UEs and the serving base station.

In an additional aspect of the disclosure, an apparatus configured for wireless communication includes means for determining, by a UE, an AR for each one or more RLM-RS determined to not have been received by the UE over a predetermined period of time, means for declaring, by the UE, a radio link issue in response to a number of AR exceeding a maximum threshold, and means for initiating, by the UE, an AR timer at the UE in response to declaration of the radio link issue.

In an additional aspect of the disclosure, a non-transitory computer-readable medium having program code recorded thereon. The program code further includes code to receive, at a UE, RLM configuration information including a set of default RLM resources associated with a connected state of the UE and a set of additional RLM resources associated with one or more pre-defined criteria; code to monitor, by the UE, the set of default RLM resources for a default RLM-RS from a serving base station during the connected state, code to observe, by the UE, a pre-defined criteria of the one or more pre-defined criteria, and code to monitor, by the UE in response to the pre-defined criteria, the set of additional RLM resources for an additional RLM-RS.

In an additional aspect of the disclosure, a non-transitory computer-readable medium having program code recorded thereon. The program code further includes code to transmit, by a base station, RLM configuration information to one or more served UEs, wherein the RLM configuration information includes a set of default RLM resources associated with a connected state of the one or more served UEs and a set of additional RLM resources associated with one or more pre-defined criteria, code to monitor, by the base station, for the one or more pre-defined criteria over a first predetermined time, code to schedule, by the base station, transmission of additional RLM-RS using the set of additional RLM resources in response to detection of a pre-defined criteria of the one or more pre-defined criteria within the first predetermined time, code to monitor, by the base station after execution of the code to schedule, for one or more pre-defined recovery criteria over a second predetermined time, and code to cease, by the base station, the scheduling in response to detection of one or more pre-defined recovery criteria within the second predetermined time.

In an additional aspect of the disclosure, a non-transitory computer-readable medium having program code recorded thereon. The program code further includes code to receive, at a UE, RLM configuration information including a set of default RLM resources associated with a connected state of the UE, code to monitor, by the UE, the set of default RLM resources for a default RLM-RS from a serving base station during the connected state, code to transmit, by the UE, a failure report to the serving base station in response to detection of one or more pre-defined failure criteria associated with a failure of the UE to receive the default RLM-RS, code to monitor, by the UE, for one or more pre-defined recovery criteria associated with acceptable link quality between the UE and the serving base station, and code to transmit, by the UE, a recovery report to the serving base station in response to detection of the one or more pre-defined recovery criteria.

In an additional aspect of the disclosure, a non-transitory computer-readable medium having program code recorded thereon. The program code further includes code to transmit, by a base station, RLM configuration information to one or more served UEs, wherein the RLM configuration information includes a set of default RLM resources associated with a connected state of the one or more served UEs, code to receive, by the base station, a failure report from the one or more served UEs, wherein the failure report is associated with a failure of the one or more served UEs to receive a default RLM-RS transmitted by the base station, and code to receive, by the base station, a recovery report from the one or more served UEs, wherein the recovery report is associated with an acceptable link quality between the one or more served UEs and the serving base station.

In an additional aspect of the disclosure, a non-transitory computer-readable medium having program code recorded thereon. The program code further includes code to determine, by a UE, an AR for each one or more RLM-RS determined to not have been received by the UE over a predetermined period of time, code to declare, by the UE, a radio link issue in response to a number of AR exceeding a maximum threshold, and code to initiate, by the UE, an AR timer at the UE in response to declaration of the radio link issue.

In an additional aspect of the disclosure, an apparatus configured for wireless communication is disclosed. The apparatus includes at least one processor, and a memory coupled to the processor. The processor is configured to receive, at a UE, RLM configuration information including a set of default RLM resources associated with a connected state of the UE and a set of additional RLM resources associated with one or more pre-defined criteria; to monitor, by the UE, the set of default RLM resources for a default RLM-RS from a serving base station during the connected state, to observe, by the UE, a pre-defined criteria of the one or more pre-defined criteria, and to monitor, by the UE in response to the pre-defined criteria, the set of additional RLM resources for an additional RLM-RS.

In an additional aspect of the disclosure, an apparatus configured for wireless communication is disclosed. The apparatus includes at least one processor, and a memory coupled to the processor. The processor is configured to transmit, by a base station, RLM configuration information to one or more served UEs, wherein the RLM configuration information includes a set of default RLM resources associated with a connected state of the one or more served UEs and a set of additional RLM resources associated with one or more pre-defined criteria, to monitor, by the base station, for the one or more pre-defined criteria over a first predetermined time, to schedule, by the base station, transmission of additional RLM-RS using the set of additional RLM resources in response to detection of a pre-defined criteria of the one or more pre-defined criteria within the first predetermined time, to monitor, by the base station after execution of the configuration to schedule, for one or more pre-defined recovery criteria over a second predetermined time, and to cease, by the base station, the scheduling in response to detection of one or more pre-defined recovery criteria within the second predetermined time.

In an additional aspect of the disclosure, an apparatus configured for wireless communication is disclosed. The apparatus includes at least one processor, and a memory coupled to the processor. The processor is configured to receive, at a UE, RLM configuration information including a set of default RLM resources associated with a connected state of the UE, to monitor, by the UE, the set of default RLM resources for a default RLM-RS from a serving base station during the connected state, to transmit, by the UE, a failure report to the serving base station in response to detection of one or more pre-defined failure criteria associated with a failure of the UE to receive the default RLM-RS, to monitor, by the UE, for one or more pre-defined recovery criteria associated with acceptable link quality between the UE and the serving base station, and to transmit, by the UE, a recovery report to the serving base station in response to detection of the one or more pre-defined recovery criteria.

In an additional aspect of the disclosure, an apparatus configured for wireless communication is disclosed. The apparatus includes at least one processor, and a memory coupled to the processor. The processor is configured to transmit, by a base station, RLM configuration information to one or more served UEs, wherein the RLM configuration information includes a set of default RLM resources associated with a connected state of the one or more served UEs, to receive, by the base station, a failure report from the one or more served UEs, wherein the failure report is associated with a failure of the one or more served UEs to receive a default RLM-RS transmitted by the base station, and to receive, by the base station, a recovery report from the one or more served UEs, wherein the recovery report is associated with an acceptable link quality between the one or more served UEs and the serving base station.

In an additional aspect of the disclosure, an apparatus configured for wireless communication is disclosed. The apparatus includes at least one processor, and a memory coupled to the processor. The processor is configured to determine, by a UE, an AR for each one or more RLM-RS determined to not have been received by the UE over a predetermined period of time, to declare, by the UE, a radio link issue in response to a number of AR exceeding a maximum threshold, and to initiate, by the UE, an AR timer at the UE in response to declaration of the radio link issue.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
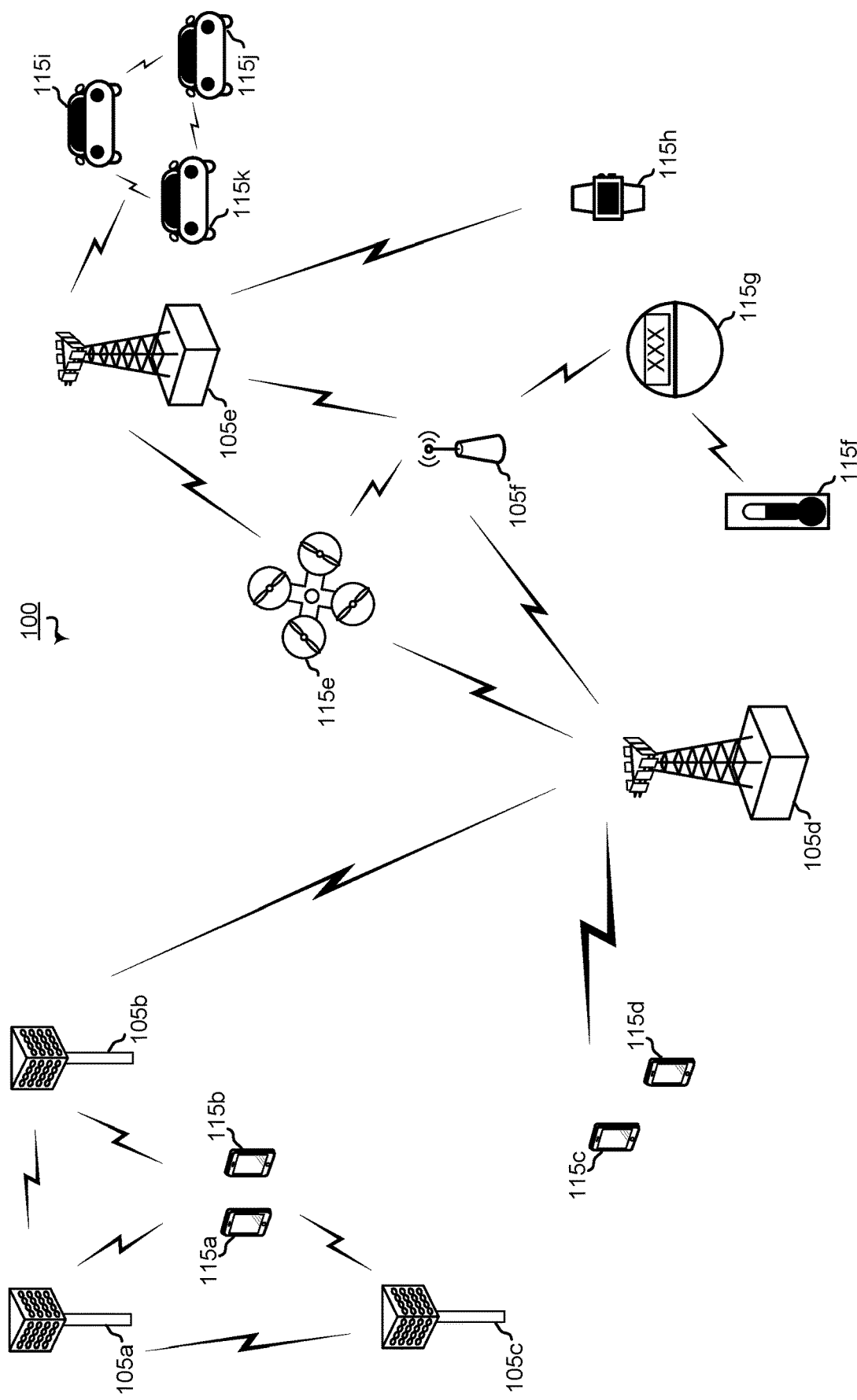
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the $3^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
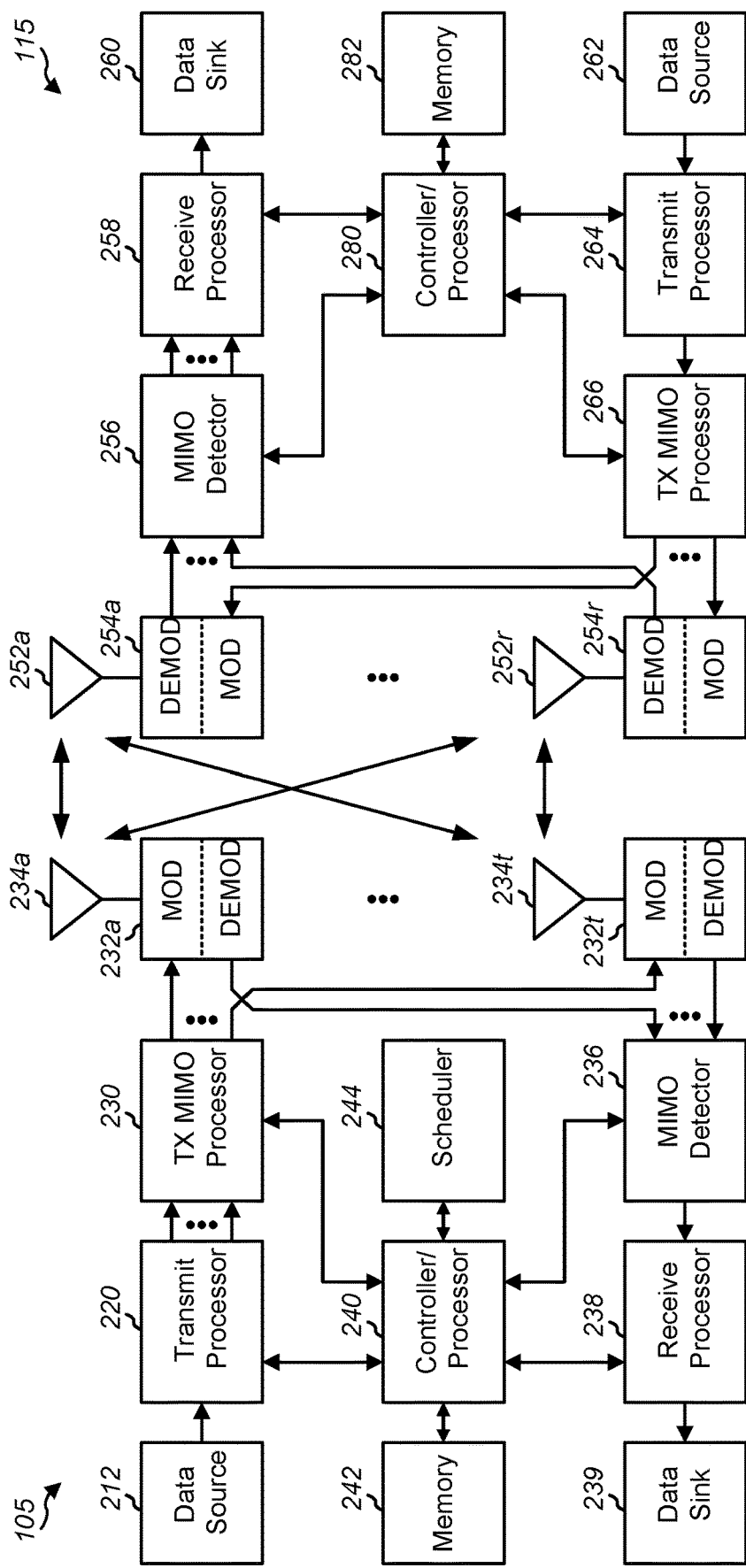
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5, 8, 10, 12, 14, 16, and 17 and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
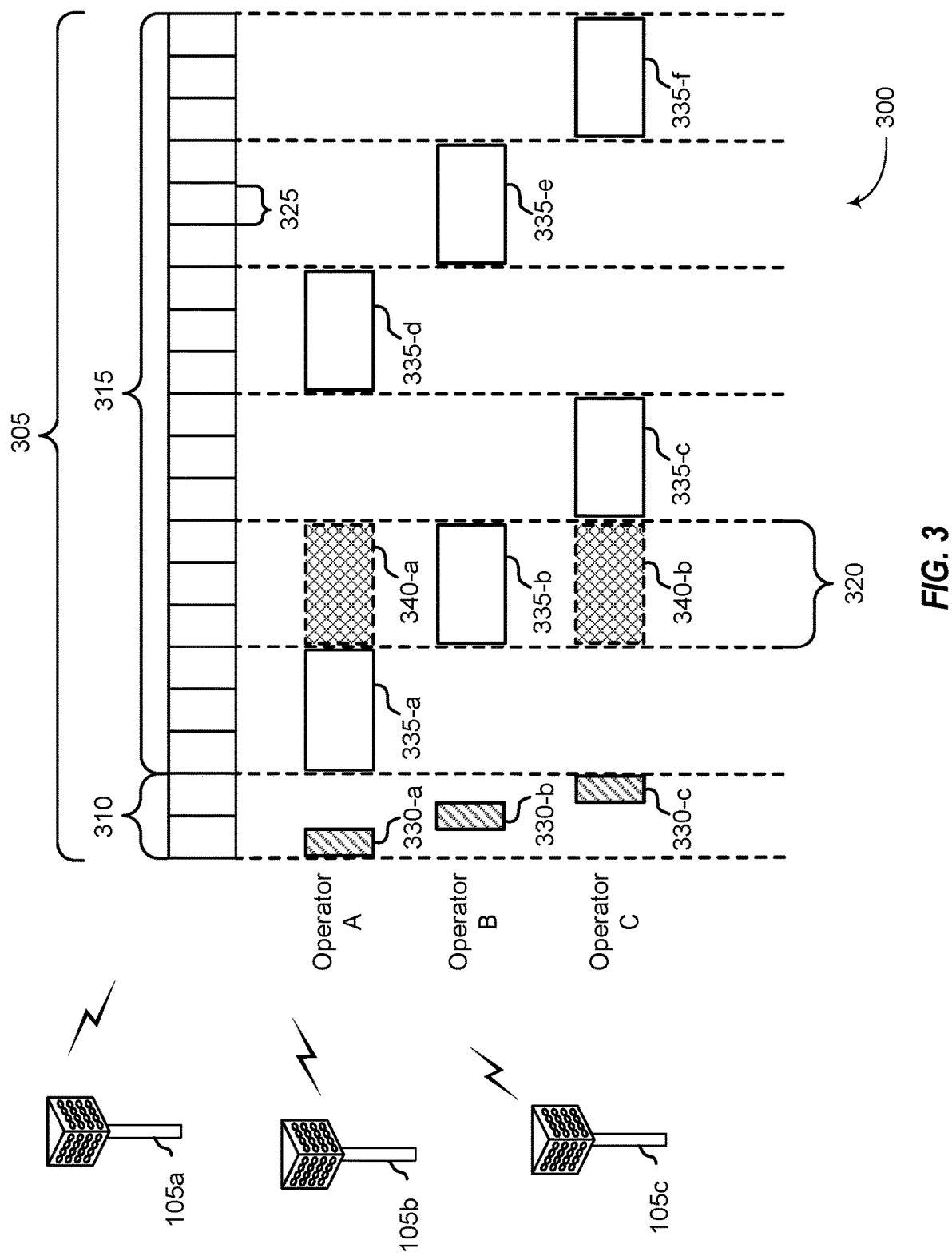
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B (e.g., G-INT-OpB), resources 335-c (e.g., G-INT-OpC) may be prioritized for Operator C, resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT (e.g., resources 335-b), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-b (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Intervals-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Figure 4:
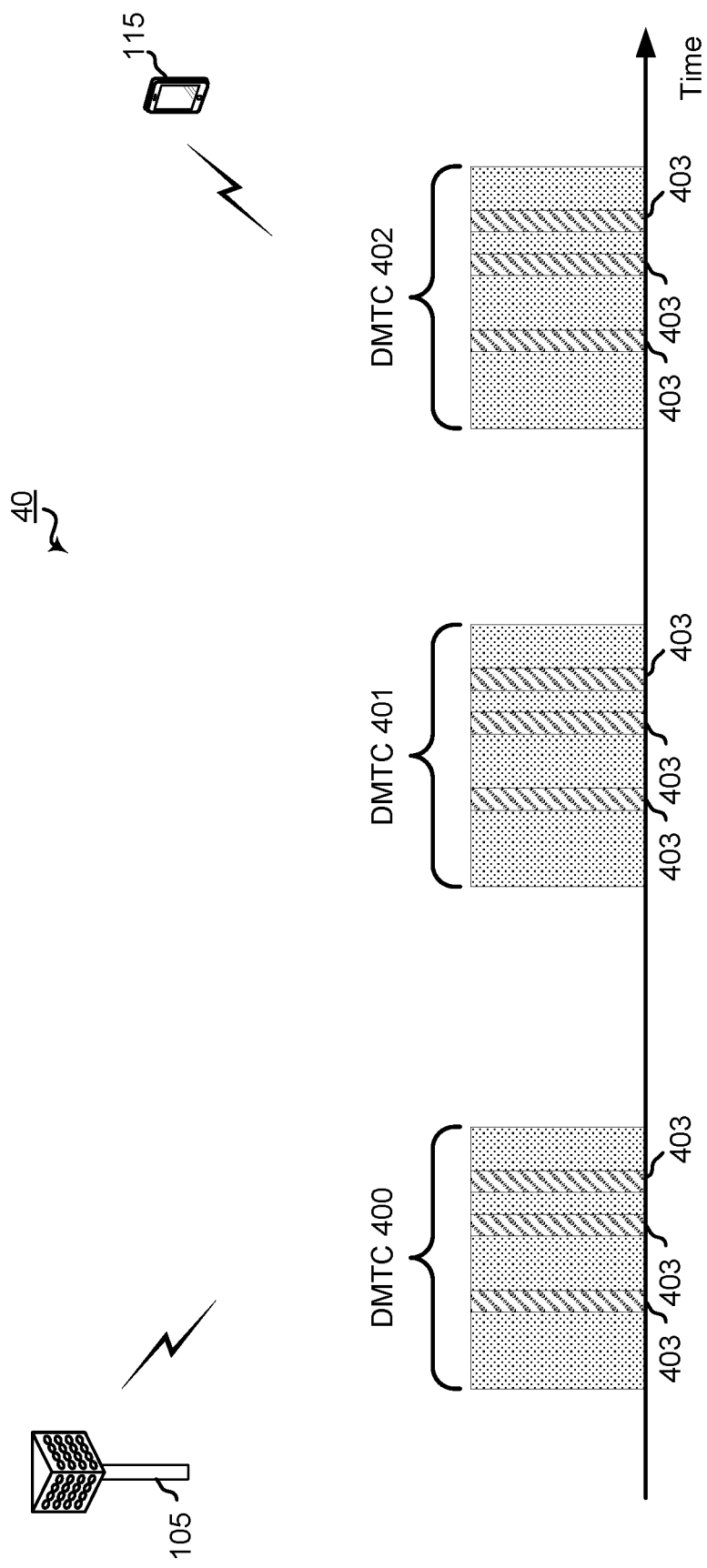
FIG. 4 is a block diagram illustrating a portion of NR unlicensed (NR-U) network.

FIG. 4 is a block diagram illustrating a portion of NR unlicensed (NR-U) network 40. To facilitate radio link monitoring (RLM) in NR networks and operations, a set of RLM reference signals (RLM-RS) resources (e.g., synchronization signal block (SSB) indices and/or channel state information reference signal (CSI-RS) resources) belonging to an active bandwidth part (BWP) may be configured for a UE. For support NR-U operations, such as in NR-U 40, standards proposals have suggested transmitting all RLM-RS resources within a common discovery reference signal (DRS) measurement timing configuration (DMTC) window. A DMTC window may be defined according to a duration and a time periodicity in order to reduce pollution of the unlicensed channel by sparse network transmissions.

In communications between base station 105 and UE 115 of NR-U network 40, within each of configured DMTC windows 400-402, base station 105 may schedule RLM-RS resources and communicate such configured resources to UE 115. UE 115 will monitor for signals during DMTC windows 400-402. Base station 105 may transmit RLM-RS 403 within the DMTC windows 400-402. Because the communication spectrum in NR-U operations, such as NR-U 40, is a shared communication spectrum, network transmissions, whether from a base station or a UE are subject to conduct successful listen before talk (LBT) procedures prior to transmitting on the shared communication network. Therefore, there may be occasions in which the network may not be able to transmit scheduled RLM-RS within the DMTC window because of successive LBT failures. A failure to transmit RLM-RS for an elongated period of time may further result in a higher radio link failure (RLF) probability, even when UE 115 may receive good signal strength from network, hence degrading user experience. Various aspects of the present disclosure are directed to modification of the radio link monitoring process by defining additional RLM-RS resources for potential RLM-RS transmission in addition to the existing scheduled RLM-RS resources (default RLM-RS resources).

Figure 5:
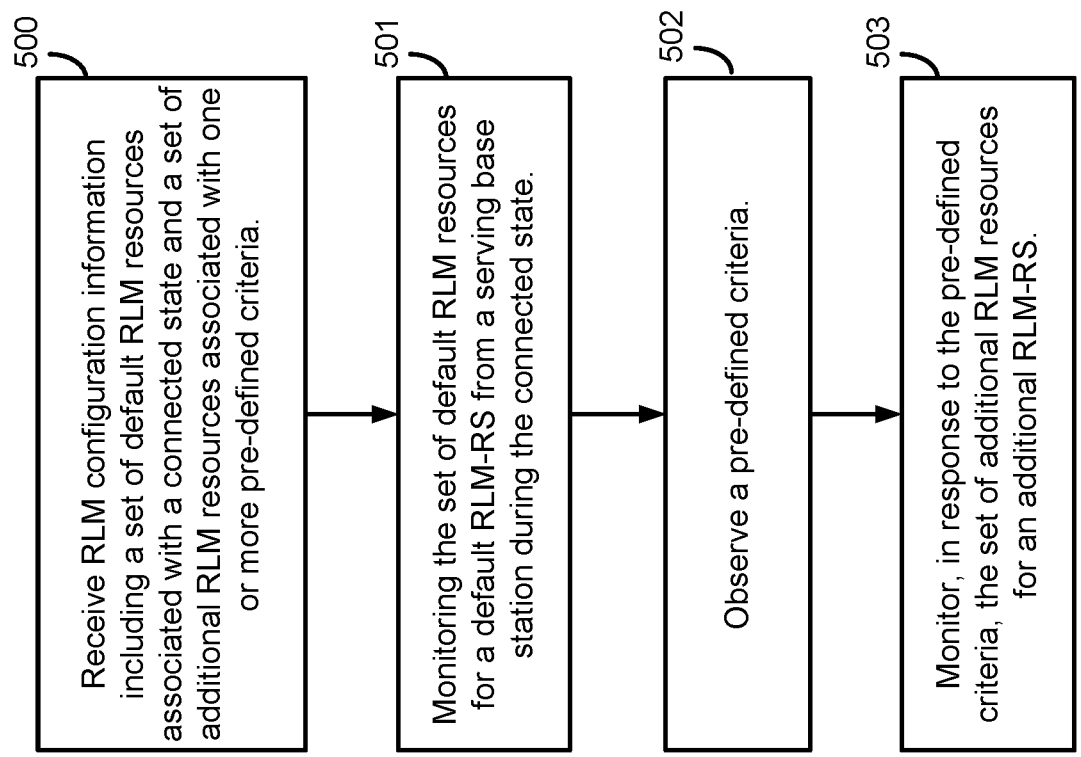
FIG. 5 is a block diagram illustrating example blocks executed to implement one aspect of the present disclosure.
Figure 19:
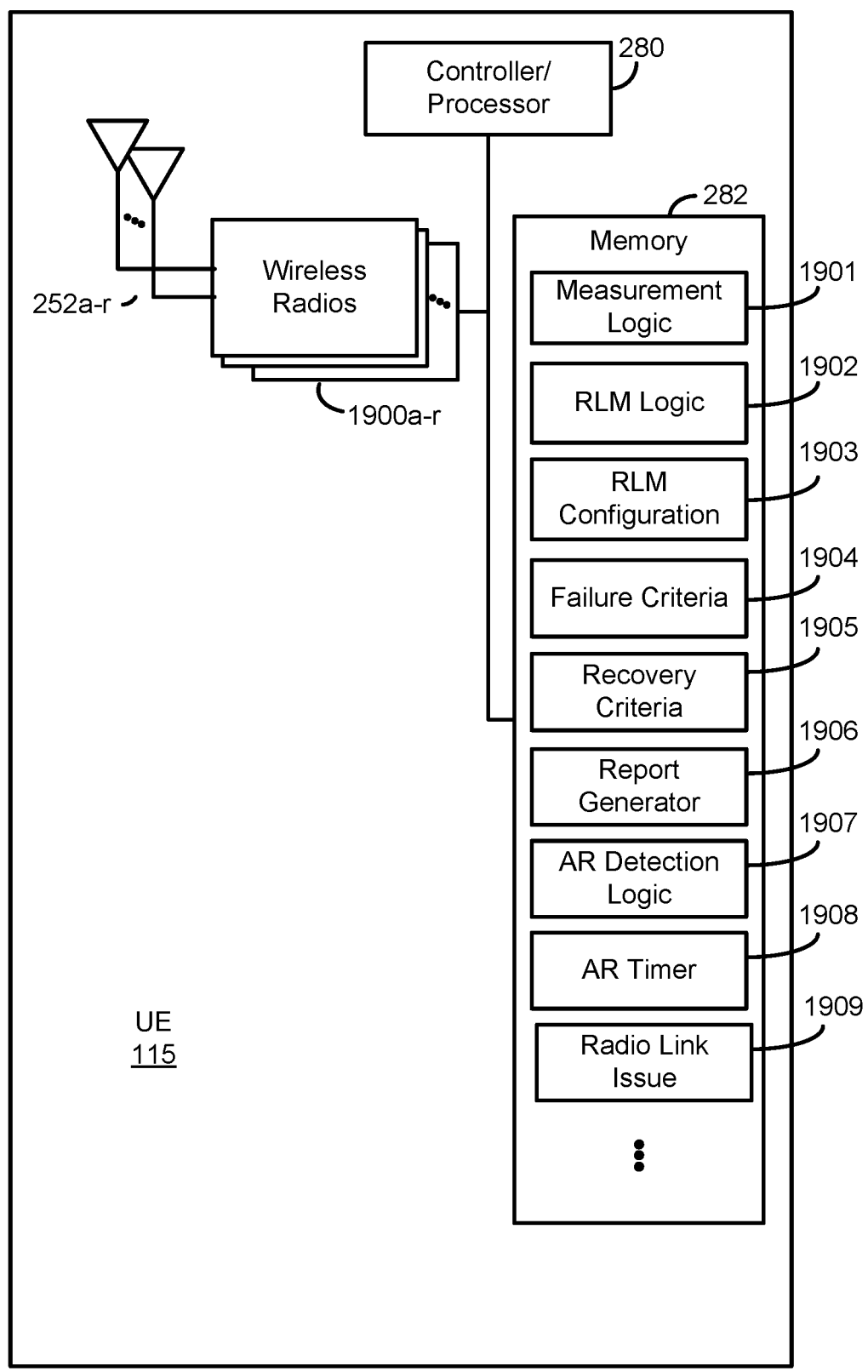
FIG. 19 is a block diagram illustrating an example UE configured according to aspects of the present disclosure.

FIG. 5 is a block diagram illustrating example blocks executed to implement one aspect of the present disclosure. The example blocks will also be described with respect to UE 115 as illustrated in FIG. 19. FIG. 19 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1900a-r and antennas 252a-r. Wireless radios 1900a-r includes various components and hardware, as illustrated in FIG. 2 for UE 115, including modulator/demodulators 254a-r, MIMO detector 256, receive processor 258, transmit processor 264, and TX MIMO processor 266.

At block 500, a UE receives RLM configuration information including a set of default RLM resources associated with a connected state of the UE and a set of additional RLM resources associated with one or more pre-defined criteria. A UE, such as UE 115, may receive configuration messages, such as an RLM configuration from a serving base station via antennas 252a-r and wireless radios 1900a-r. UE 115 may store the configuration information in memory 282 at RLM configuration 1803. The RLM configuration information stored in memory 282 may include configuration of default RLM resources and configuration of additional RLM resources that may be associated with various pre-defined failure and recovery criteria. Such pre-defined failure and recovery criteria may be in memory 282 at failure criteria 1904 and recovery criteria 1905 within UE 115.

At block 501, the UE monitors the set of default RLM resources for a default RLM-RS from a serving base station during the connected state. At regular times during the connected state where link conditions are favorable between UE 115 and the serving base station, UE 115, according to the RLM configuration information, monitors signals during the default RLM-RS resources. Signals received via antennas 252a-r and wireless radios 1900a-r may be evaluated through execution, under control of controller/processor 280, of measurement logic 1901. The execution environment of measurement logic 1901 allows UE 115 to determine whether detected candidate default RLM-RS are, in fact, validly received default RLM-RS.

At block 502, the UE observes a pre-defined criteria of the one or more pre-defined criteria. UE 115, accessing the pre-defined criteria at failure criteria 1904, may observe one or more of the failure criteria. The criteria identified within failure criteria 1904 may be accessed by UE 115 to determine when failure criteria have occurred. For example, UE 115 may have a radio link failure (RLF) timer activated due to detection of excessive interference or failure to accurately demodulator or decode received signals. Similarly, UE 115 may identify a threshold number of absence of RLM-RS (AR) indications within a specific time period. Additionally, UE 115 may identify a threshold number of consecutive out-of-synchronization (OOS) indication, caused by observation of out-of-synchronization conditions at UE 115.

At block 503, the UE, in response to the pre-defined criteria, the set of additional RLM resources for an additional RLM-RS. The failure criteria occurring with respect to the valid receipt of default RLM-RS may trigger the serving base station to begin transmitting both default and additional RLM-RS. UE 115, according to the aspects of the present disclosure, would, under control of controller/processor 280, execute RLM logic 1902. The execution environment of RLM logic 1902 allows UE 115 to monitor the radio link with the serving base station. The functionality of RLM logic 1902 provides UE 115 with instructions to begin monitoring the additional RLM-RS resources for RLM-RS from the serving base station in addition to monitoring the default RLM-RS resources. Upon detecting the failure criteria at block 502, functionality within the execution environment of RLM logic 1902 causes UE 115, under control of controller/processor 280 to indicate to wireless radios 1900a-r to tune to the additional RLM-RS resources and begin monitoring for additional RLM-RS from the serving base station.

Figure 6:
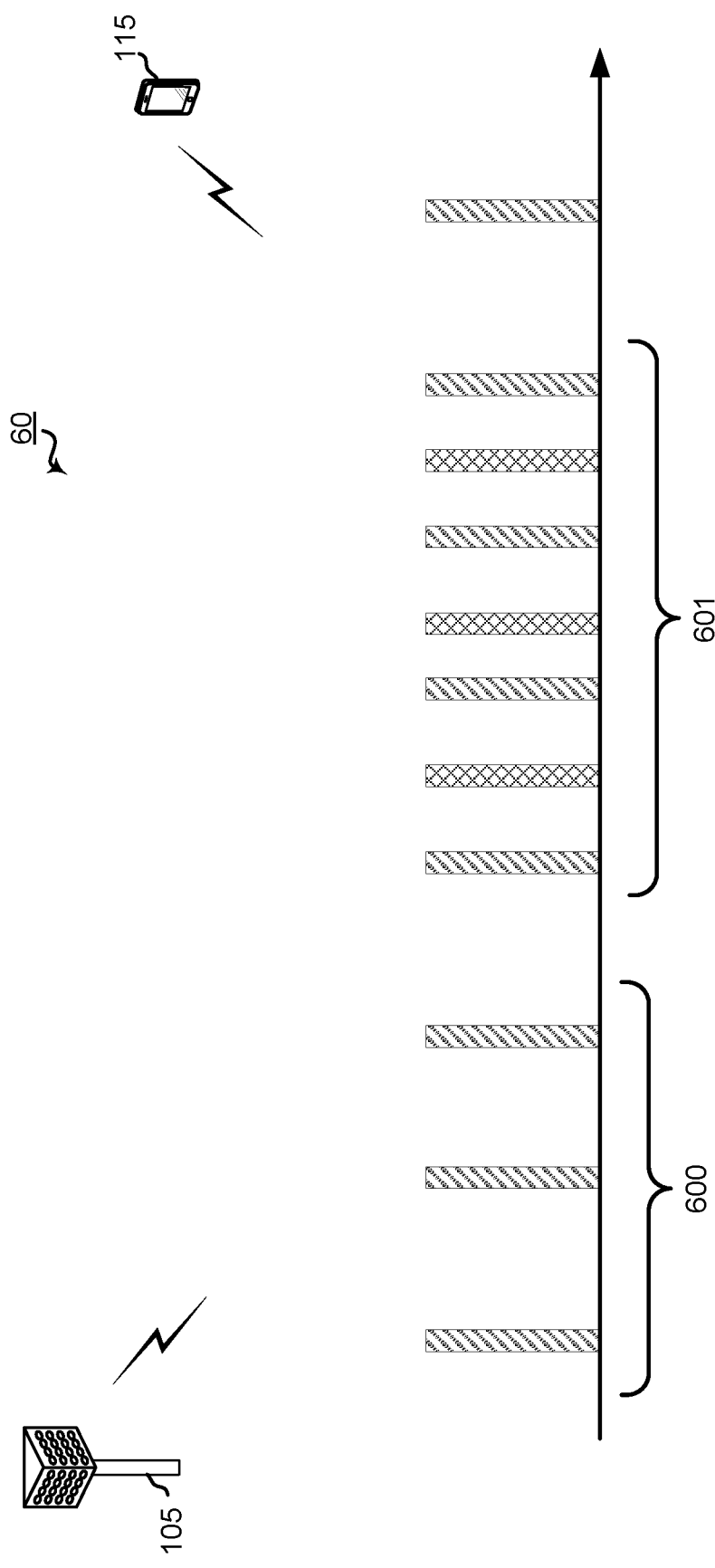
FIG. 6 is a block diagram illustrating a portion of an NR-U network in which a base station and UE perform communications according to one aspect of the present disclosure.

FIG. 6 is a block diagram illustrating a portion of NR-U network 60 in which base station 105 and UE 115 perform communications according to one aspect of the present disclosure. Apart from the default RLM-RS resources, UE 115 may be configured with additional RLM-RS resources. The network, through base station 105, configures two sets of RLM-RS resources: default RLM-RS resources and additional RLM-RS resources. Default RLM-RS resources should be monitored by UE 115 over the entire duration in which UE 115 is in an RRC connected state. The additional RLM-RS resources configured for UE 115 by base station 105 provide additional locations for UE 115 to monitor for RLM-RS transmitted by base station 105. In some location, such as window 600, base station 105 would be attempting transmission of default RLM-RS on the scheduled default resources, while in window 601, base station 105 has configured the default set of RLM-RS resources and the additional set of RLM-RS resources. As will be described in greater detail below, various mechanisms may be used to trigger base station 105 to begin transmitting the additional RLM-RS and UE 115 to monitor for these additional RLM-RS and also mechanisms.

Figure 7:
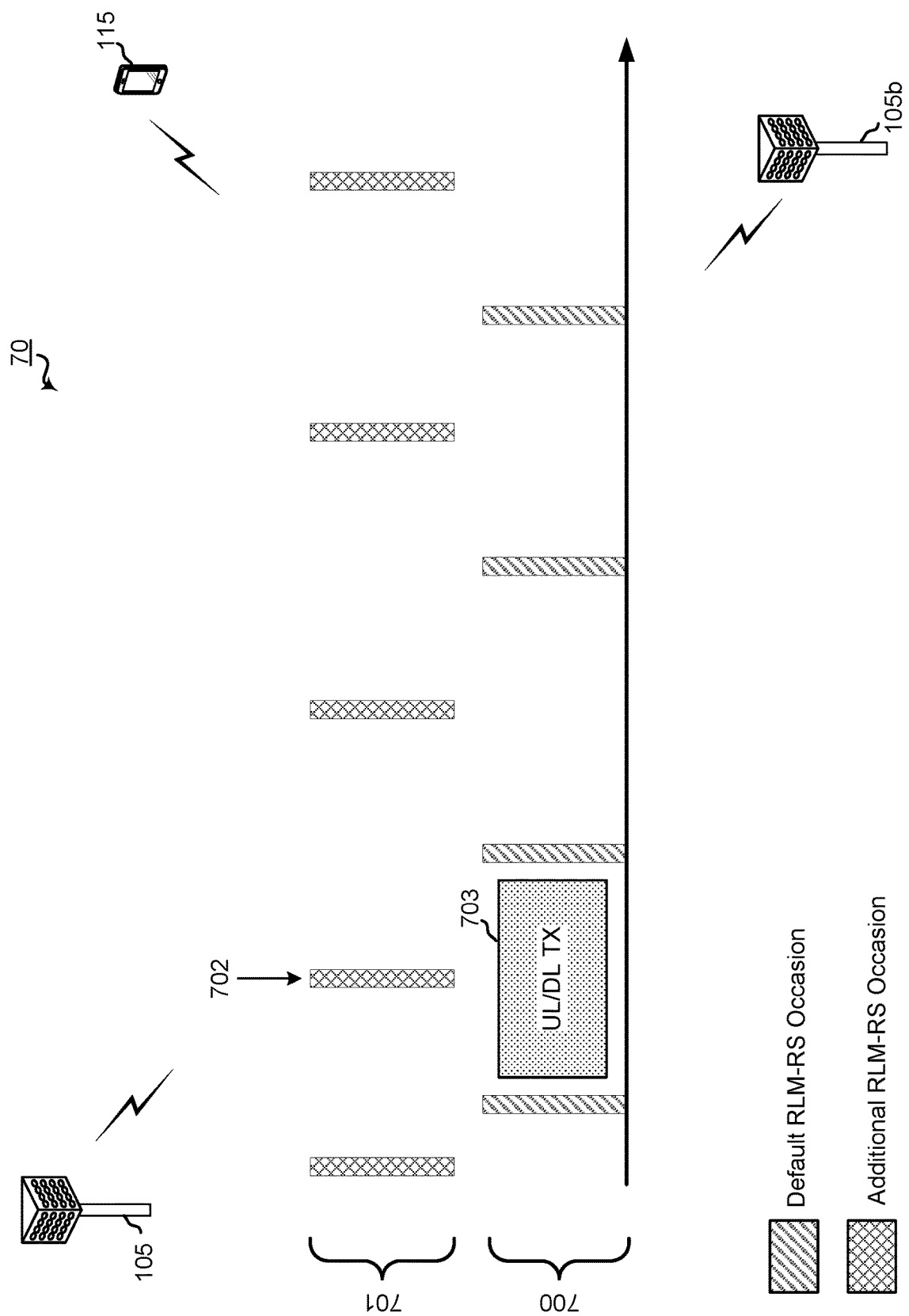
FIG. 7 is a block diagram illustrating a portion of an NR-U network in which a base station and UE perform communications according to one aspect of the present disclosure.

FIG. 7 is a block diagram illustrating a portion of NR-U network 70 in which base station 105 and UE 115 perform communications according to one aspect of the present disclosure. In NR networks, including NR-U networks, such as NR-U network 70, a wide channel bandwidth may be allocated for communication (e.g., up to 100 MHz or more). However, every network node may not be allocated to the entire channel bandwidth. In order to more efficiently use the channel bandwidth, communications between nodes may be allocated to a portion of the channel bandwidth, a bandwidth part (BWP). The active BWP provides base station 105 and UE 115 with a defined set of frequencies or channels within which to conduct communications.

According to the aspect of the present disclosure illustrated in FIG. 7, the network may configure the additional RLM-RS for transmission in a non-active BWP. Thus, for each RLM-RS resource, base station 105 indicates to UE 115 the downlink BWP identifier (ID) associated with the RLM-RS. For example, base station 105 indicates to UE 115 that communications will occur using active BWP 700. Base station 105 would further signal to UE 115 the RLM configurations which include identification of the BWP ID designated for alternative RLM-RS (non-active BWP 701). Thus, when alternative RLM-RS are enabled, UE 115 would know to tune to non-active BWP 701 to monitor for such alternative RLM-RS.

According to a first optional aspect, UE 115 can autonomously determine a measurement gap in which to tune to non-active BWP 701. For example, when attempting to monitor for RLM-RS 702, UE 115 may determine to tune to non-active BWP 701 during uplink/downlink transmission window 703. In a second optional aspect, the network can provide a measurement gap to UE 115. Therefore, within control signaling from base station 105, UE 115 may receive allocation or assignment of a measurement gap during uplink/downlink transmission window 703 in order to tune to non-active BWP 701 to monitor for RLM-RS 702.

It should be noted that, depending on the capabilities of UE 115, UE 115 may tune away from active BWP 700 in order to tune to non-active BWP 701. With more advanced capabilities, UE 115 may maintain some of its wireless radios tuned to active BWP 700 and use other of its wireless radios to tune to non-active BWP 701 during the measurement gap.

Is should be further noted that according to select aspects of the present disclosure, the identified gap, whether autonomously identified by UE 115 or identified by the network through signaling from base station 105, may be used exclusively for such RLM-RS monitoring.

As noted above, RLM-RS resources may include SSB transmissions. According to aspects of the present disclosure, the additional RLM-RS may also include a set of SSB resources. For the additional RLM-RS resources, the network, through signaling from base station 105, may further provide additional DMTC configuration information indicating the time-frequency resource along with various transmission parameters of the SSBs, such as subcarrier spacing, SSB index-to-time mapping, and the like. Base station 105 signaling may further indicate the physical cell ID (PCI) information of the RLM-RS. Where no PCI information is provided, UE 115 may assume that the RLM-RS use the same PCI as the serving cell. Additionally, signaling from base station 105 may indicate the network directed power offset used for SSB transmission with respect to the cell-defining SSBs (CD SSBs).

In a first optional aspect of the present disclosure, UE 115 may use the same set of SSB indices used by the default RLM-RS to monitor for the additional RLM-RS. However, according to the aspects of the present disclosure, the additional RLM-RS may use a different set of SSB indices than which are used by the default RLM-RS. In such a second optional aspect, the network may configure an independent set of SSB indices specifically for the additional RLM-RS. Base station 105 would signal configuration information that identifies this independent set of SSB indices to UE 115. Therefore, the additional DMTC configuration information may identify the specific SSB indices used from this independent set of SSB indices.

It should be noted that, according to alternative aspects of the present disclosure, the additional RLM-RS may be transmitted from a different network node than the serving base station, base station 105, which transmits the default RLM-RS. For example, additional RLM-RS, such as additional RLM-RS 702 may be transmitted by base station 105b. Depending on the relationship between base station 105 and base station 105b, the default RLM-RS transmitted by base station 105 may be quasi-co-located (QCL) with the additional RLM-RS transmitted by base station 105b. QCL status may be determined by geographic proximity between base station 105 and base station 105a or may be determined by the type of backhaul (ideal vs non-ideal) between base station 105 and base station 105a. The network may provide the QCL indication via signaling from base station 105 to UE 115. The signaled QCL relation between the additional RLM-RS and the default RLM-RS may indicate the relationship between an SSB index of the additional RLM-RS and an SSB index of CD-SSB.

It should be noted that in scenarios where no such QCL information is provided by network, UE 115 may assume that the SSB index of the additional RLM-RS is QCL with the same SSB index of the CD-SSB.

According to the various aspects of the present disclosure, the additional RLM-RS can also include static, semi-static, or dynamic CSI-RS resources. Thus, as UE 115 monitors for additional RLM-RS 702, it may be monitoring for static, semi-static, or dynamic CSI-RS. However, UE 115 would not monitor the CSI-RS resource(s) for additional RLM-RS 702 without first receiving an activation command or PDCCH transmission triggering the CSI-RS resources where the CSI-RS resources to monitor are semi-static or dynamic.

Figure 8:
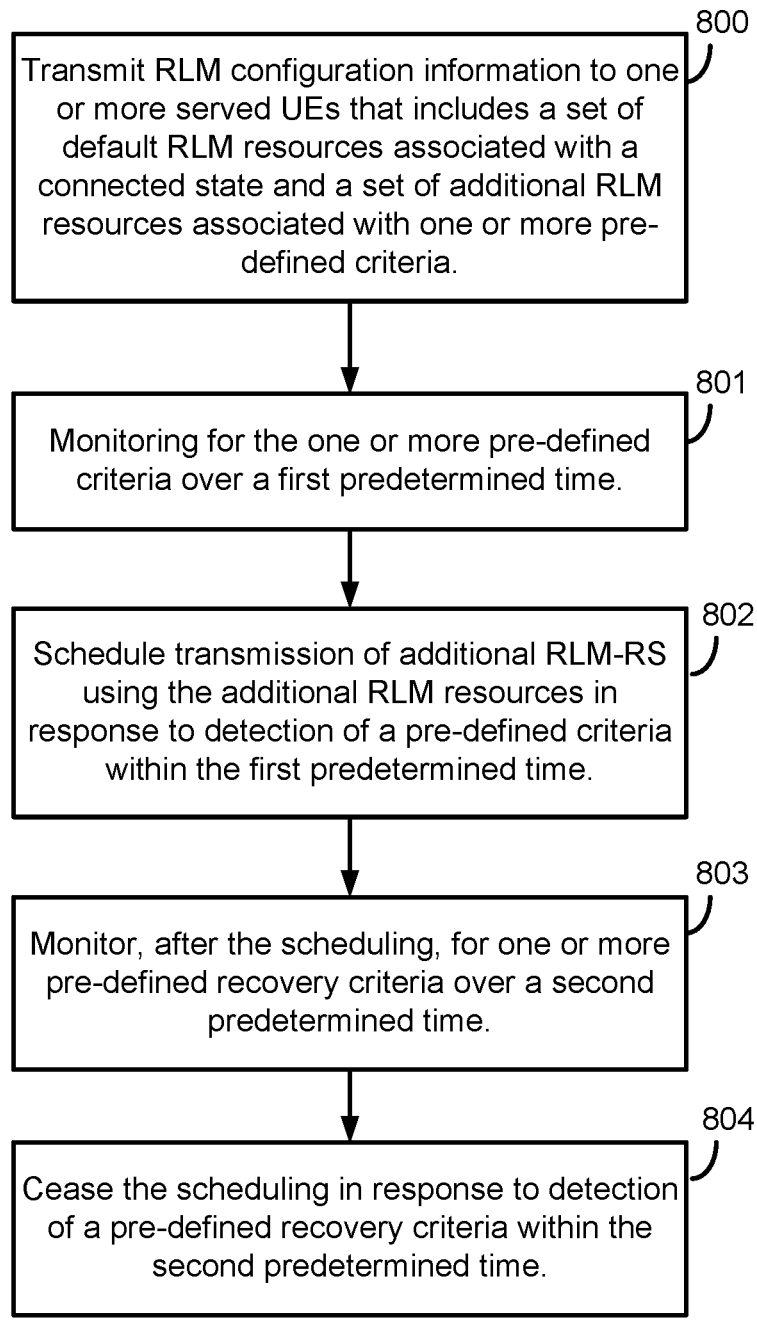
FIG. 8 is a block diagram illustrating example blocks executed to implement one aspect of the present disclosure.
Figure 20:
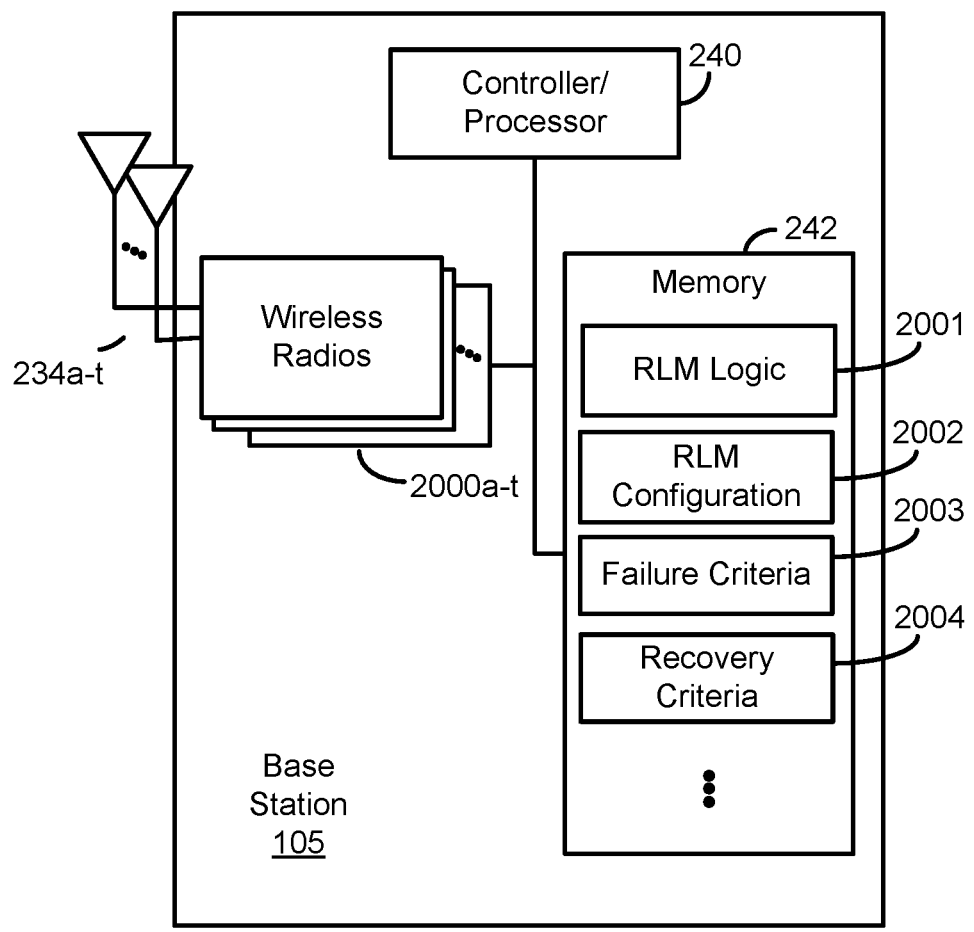
FIG. 20 is a block diagram illustrating an example base station configured according to aspects of the present disclosure.

FIG. 8 is a block diagram illustrating example blocks executed to implement one aspect of the present disclosure. The example blocks will also be described with respect to base station 105 as illustrated in FIG. 20. FIG. 20 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 2000a-t and antennas 234a-t. Wireless radios 2000a-t includes various components and hardware, as illustrated in FIG. 2 for base station 105, including modulator/demodulators 232a-t, MIMO detector 236, receive processor 238, transmit processor 220, and TX MIMO processor 230.

At block 800, a base station transmits RLM configuration information to one or more served UEs, wherein the RLM configuration information includes a set of default RLM resources associated with a connected state of the one or more served UEs and a set of additional RLM resources associated with one or more pre-defined criteria. A base station, such as base station 105, configured according to the aspects of the present disclosure, would include RLM logic 2001. RLM logic 2001 includes the functionalities identified in the various aspects of the present disclosure defining operations with default and additional RLM-RS. Base station 105, under control of controller/processor 240, executes RLM logic 2001. The execution environment of RLM logic 2001 allows base station 2001 to determine RLM configuration information that includes allocation of default RLM-RS resources and additional RLM-RS resources. Such configuration information may be stored in memory 242 at RLM configuration 2002. The execution environment of RLM logic 2001 provides for base station 105, under control of controller/processor 240, to transmit the RLM configuration information, including configuration for both default and additional RLM-RS resources, to served UEs via wireless radios 2000a-t and antennas 234a-t.

At block 801, the base station monitors for the one or more pre-defined criteria over a first predetermined time. Base station 105 includes pre-defined criteria that address both link failure and link recovery criteria. Such pre-defined criteria is stored in memory 242 at failure criteria 2003 and recovery criteria 2004, respectively. Within the execution environment of RLM logic 2001, base station 105 monitors for any failure criteria. For example, base station 105 may monitor for listen before talk (LBT) failures for individual RLM-RS attempted for transmission. Where a threshold number of LBT failures occur within a given timer period, base station 105 may identify a failure condition. Additionally, base station 105 may monitor for channel acquisition failure during DMTC occasions. Additional RLM-RS resources are transmitted if network is not able to transmit any DRS within DMTC for $M_{Fail}$ number of times within a time period.

At block 802, the base station schedules transmission of additional RLM-RS using the set of additional RLM resources in response to detection of a pre-defined criteria of the one or more pre-defined criteria within the first predetermined time. Upon detection of the failure criteria, base station 105, within the execution environment of RLM logic 2001, begins transmission of the additional RLM-RS according to the configured resources in RLM configuration 2002.

At block 803, the base station monitors, after the scheduling, for one or more pre-defined recovery criteria over a second predetermined time. Within the execution environment of RLM logic 2001, base station 105 may also monitor for any recovery criteria when it is currently in a state of additional RLM-RS transmissions. As with the failure criteria, base station 105 may monitor for successful LBT for attempted RLM-RS. Where a threshold number of RLM-RS are successfully transmitted within a given timer period, base station 105 may identify a recovery condition. Additionally, base station 105 may monitor for channel acquisition success during DMTC occasions.

At block 804, the base station ceases the scheduling in response to detection of one or more pre-defined recovery criteria within the second predetermined time. Within the execution environment RLM logic 2001, base station 105 may cease transmitting the additional RLM-RS when the network is either able to successfully transmit a number of RLM-RS within a timer period or transmit any DRS within DMTC for $M_{Success}$ number of times within the time period.

Figure 9:
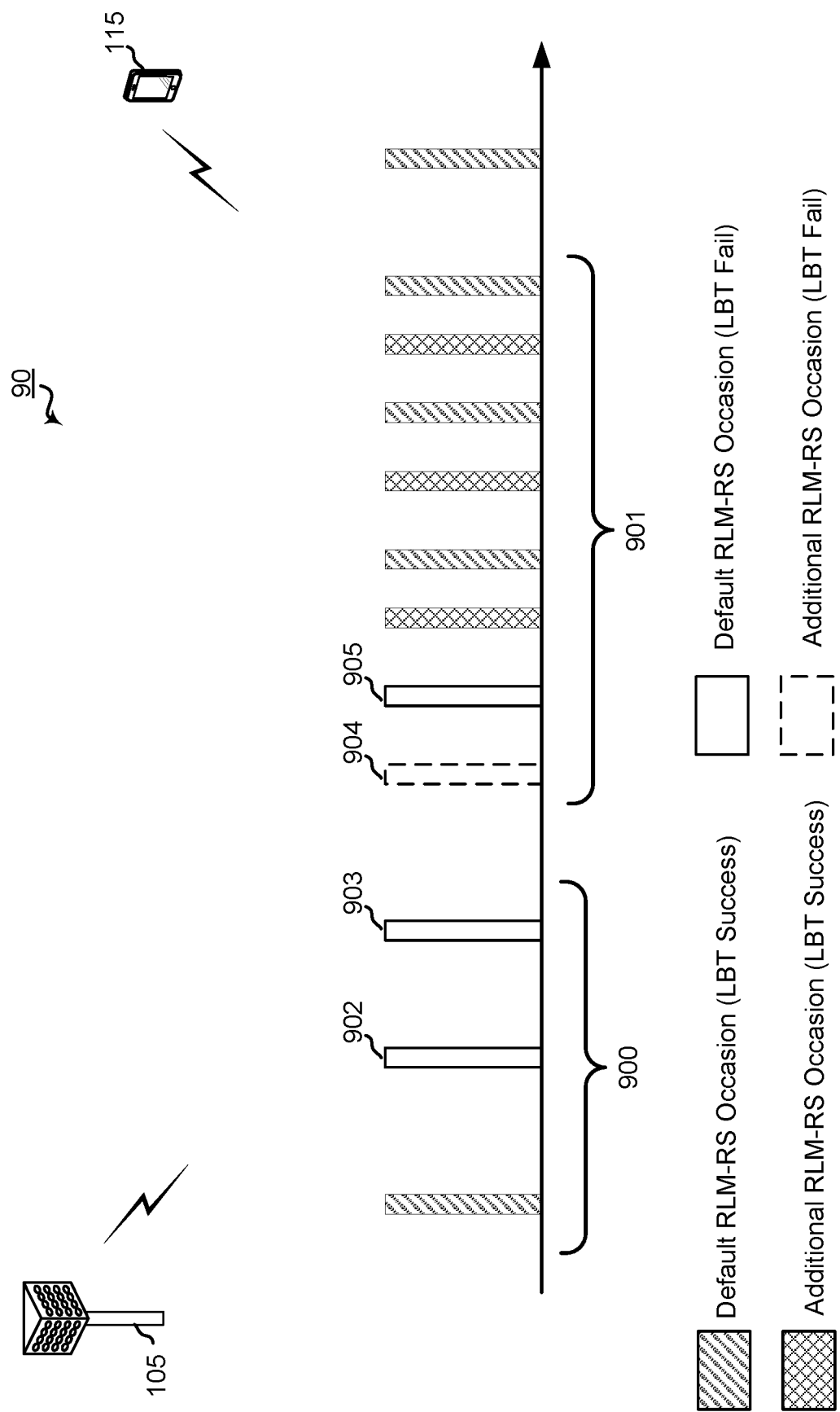
FIG. 9 is a block diagram illustrating a portion of an NR-U network in which a base station and UE perform communications according to one aspect of the present disclosure.

FIG. 9 is a block diagram illustrating a portion of NR-U network 90 in which base station 105 and UE 115 perform communications according to one aspect of the present disclosure. In maintaining a connection between base station 105 and UE 115, base station 105 uses various means for triggering transmission of the additional RLM-RS resources. According to one optional aspect described with respect to FIG. 8, scheduling alternative RLM-RS and stopping alternative RLM-RS may be based on channel acquisition success or failure during DMTC. In a second example aspect, as illustrated in FIG. 9, base station 105 may initiate additional RLM-RS resources based on autonomous criteria. For example, during default RLM period 900, in which base station 105 attempts to transmit default RLM-RS, each transmission of such default RLM-RS is only performed after detecting a successful LBT procedure. Accordingly, at 902 and 903, the failed LBT procedures result in no RLM-RS transmission by base station 105. Additional RLM-RS resources are scheduled for transmission if the number LBT fails for default RLM-RS within default RLM period 900 or a predetermined period of time meets or exceeds $M_{Fail}$ number of times.

The network, via base station 105, may then stop scheduling the additional RLM-RS when base station 105 is able to successfully transmit $M_{Success}$ RLM-RS within another predetermined time period. Thus, upon detecting the two LBT failures at 902 and 903, (e.g., $M_{Fail}=2$), base station 105 initiates the additional RLM-RS resources for default plus additional RLM period 901. After two further LBT failures of base station 105 at 904 and 905 in attempting to transmit additional RLM-RS and default RLM-RS, respectively, LBT procedures beginning to become successful allowing base station 105 to transmit both additional and default RLM-RS for UE 115. Upon detecting three consecutive successful transmissions of both default and additional RLM-RS (e.g., $M_{Success}=3$ each or 6 total), base station 105 may cease default plus additional RLM period 901 and further transmission of the additional RLM-RS.

Figure 10:
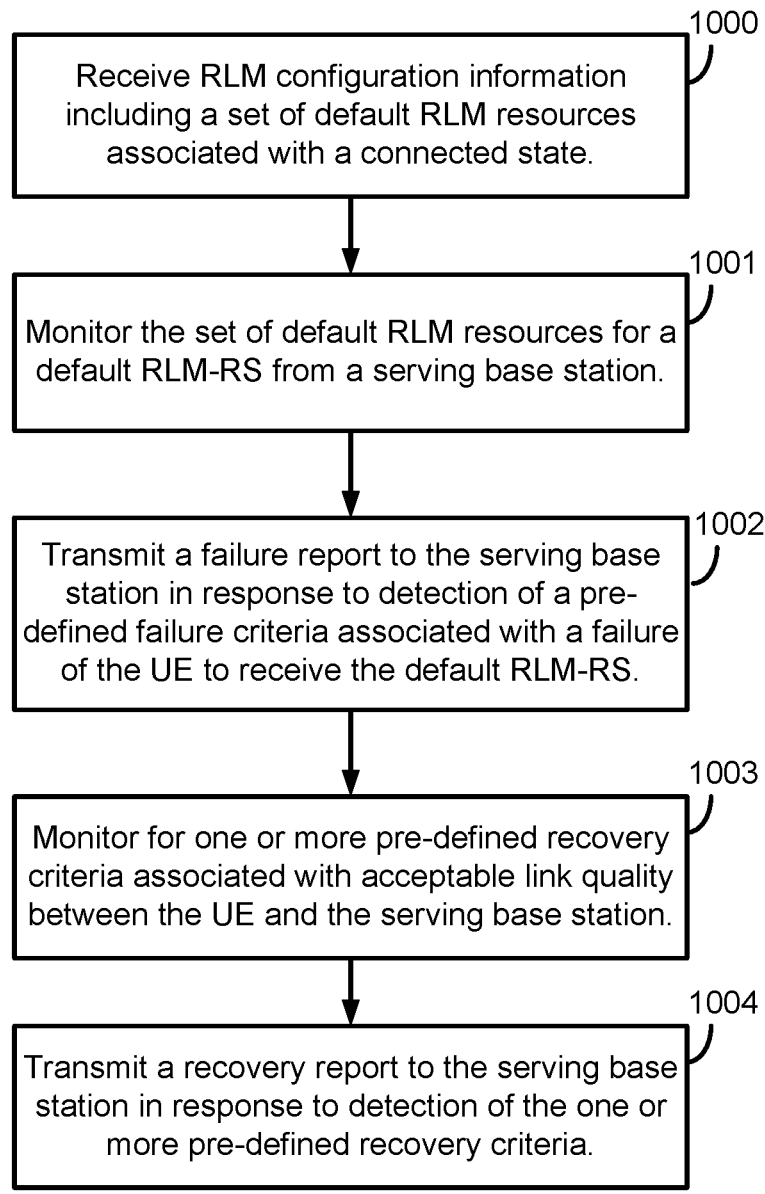
FIG. 10 is a block diagram illustrating example blocks executed to implement one aspect of the present disclosure.

FIG. 10 is a block diagram illustrating example blocks executed to implement one aspect of the present disclosure. The example blocks will also be described with respect to UE 115 as illustrated in FIG. 19.

At block 1000, a UE receives RLM configuration information including a set of default RLM resources associated with a connected state of the UE. UE 115 receives configuration messages, such as an RLM configuration from a serving base station via antennas 252a-r and wireless radios 1900a-r. UE 115 may store the configuration information in memory 282 at RLM configuration 1803. The RLM configuration information stored in memory 282 may include configuration of default RLM resources. The RLM configuration information may further include configuration information for additional RLM resources that may be associated with various pre-defined failure and recovery criteria. Such pre-defined failure and recovery criteria may be in memory 282 at failure criteria 1904 and recovery criteria 1905 within UE 115.

At block 1001, the UE monitors the set of default RLM resources for a default RLM-RS from a serving base station during the connected state. During the connected state, where link conditions are favorable between UE 115 and the serving base station, UE 115, according to the RLM configuration information, monitors signals during the default RLM-RS resources. Signals received via antennas 252a-r and wireless radios 1900a-r may be evaluated through execution, under control of controller/processor 280, of measurement logic 1901. The execution environment of measurement logic 1901 allows UE 115 to determine whether detected candidate default RLM-RS are, in fact, validly received default RLM-RS.

At block 1002, the UE transmits a failure report to the serving base station in response to detection of one or more pre-defined failure criteria associated with a failure of the UE to receive the default RLM-RS. The criteria identified within failure criteria 1904 may be accessed by UE 115 to determine when failure criteria have occurred. As noted in previous examples, UE 115 may have a radio link failure (RLF) timer activated due to detection of excessive interference or failure to accurately demodulator or decode received signals. Similarly, UE 115 may identify a threshold number of absence of RLM-RS (AR) indications within a specific time period. Additionally, UE 115 may identify a threshold number of consecutive out-of-synchronization (OOS) indication, caused by observation of out-of-synchronization conditions at UE 115. Upon observing any such failure criteria, UE 115, under control of controller/processor 280, executes report generator logic 1906. The execution environment of report generator logic 1906 provide the functionality to UE 115 to generate a report that includes identification of the failure criteria. UE 115 would then transmit the failure report to the serving base station via wireless radios 1900a-r and antennas 252a-r.

At block 1003, the UE monitors for one or more pre-defined recovery criteria associated with acceptable link quality between the UE and the serving base station. The criteria identified within recovery criteria 1905 may be accessed by UE 115 to determine when pre-defined recovery criteria have occurred. For example, UE 115 may detect that a running RLF timer has been stopped or deactivated due to detection of favorable link conditions. Similarly, UE 115 may identify a threshold number of indications, other than AR indication, that suggest a favorable link condition within a specific time period. Additionally, UE 115 may identify a threshold number of consecutive in-synchronization (IS) indications, caused by observation of in-synchronization conditions at UE 115.

At block 1004, the UE transmits a recovery report to the serving base station in response to detection of the one or more pre-defined recovery criteria. Upon observing any such pre-defined recovery criteria, UE 115, under control of controller/processor 280, executes report generator logic 1906. The execution environment of report generator logic 1906 provide the functionality to UE 115 to generate a report that includes identification of the recovery criteria. UE 115 would then transmit the recovery report to the serving base station via wireless radios 1900a-r and antennas 252a-r.

Figure 11:
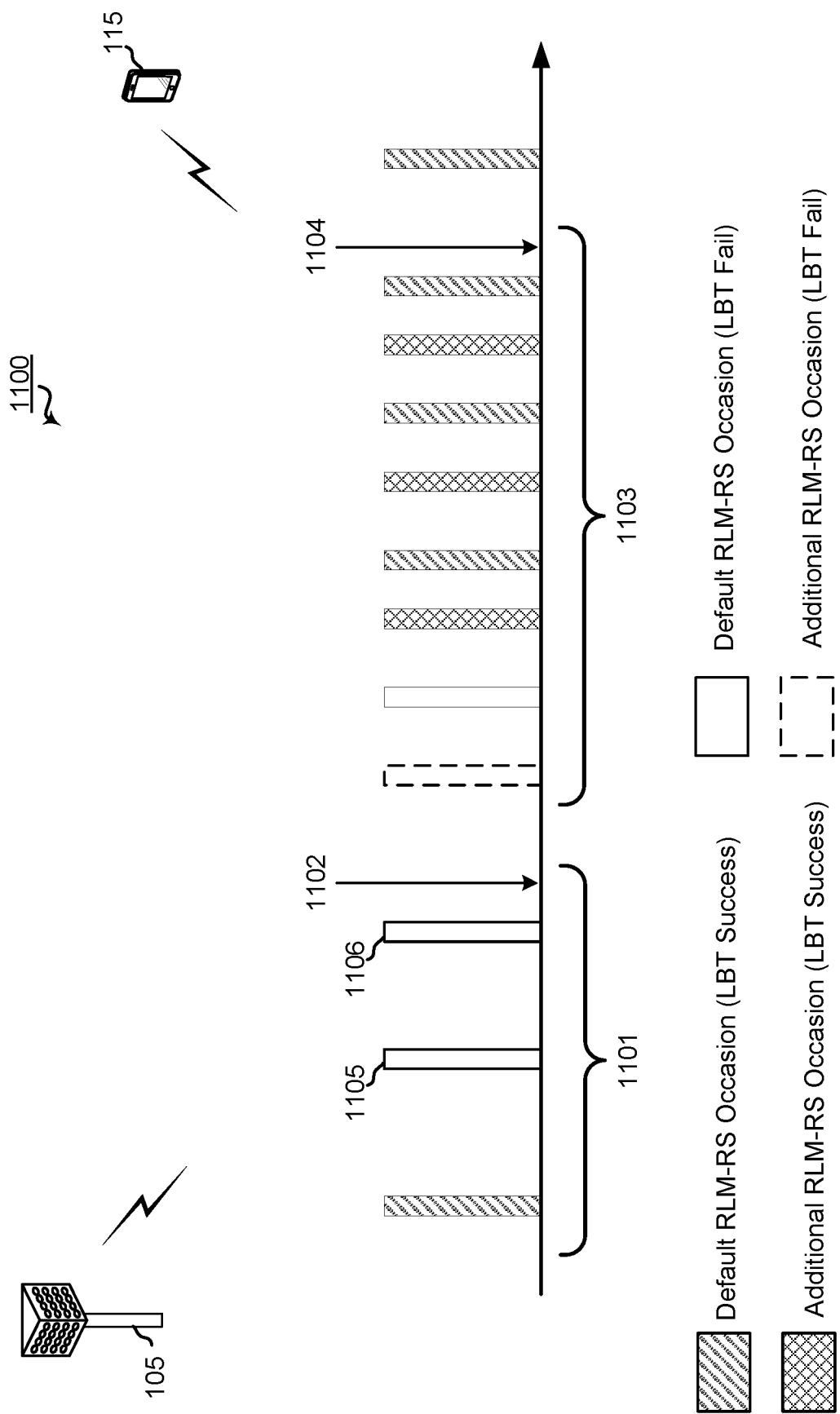
FIG. 11 is a block diagram illustrating a portion of an NR-U network in which a base station and UE perform communications according to one aspect of the present disclosure.

FIG. 11 is a block diagram illustrating a portion of NR-U network 1100 in which base station 105 and UE 115 perform communications according to one aspect of the present disclosure. As noted with respect to FIG. 10, base station 105 may initiate transmission of additional RLM-RS resources based upon reporting transmitted by UE 115. UE 115 may send a report to base station 105 indicating the absence of RLM-RS for a duration of time. This report can take various formats, including RRC message, L1 message, or other such signaling (e.g. PRACH, PUCCH, etc.) reserved to report such failure of detection. UE 115 may transmit the failure report based on any number of different criteria. For example, when the radio link failure (RLF) timer is triggered on at UE 115, UE 115 may transmit the failure report to base station 105. Additionally, where a certain number, $N_{Fail}$, absence of RLM-RS indications have been identified within a predefined time period, UE 115 may transmit the failure report.

Figure 16:
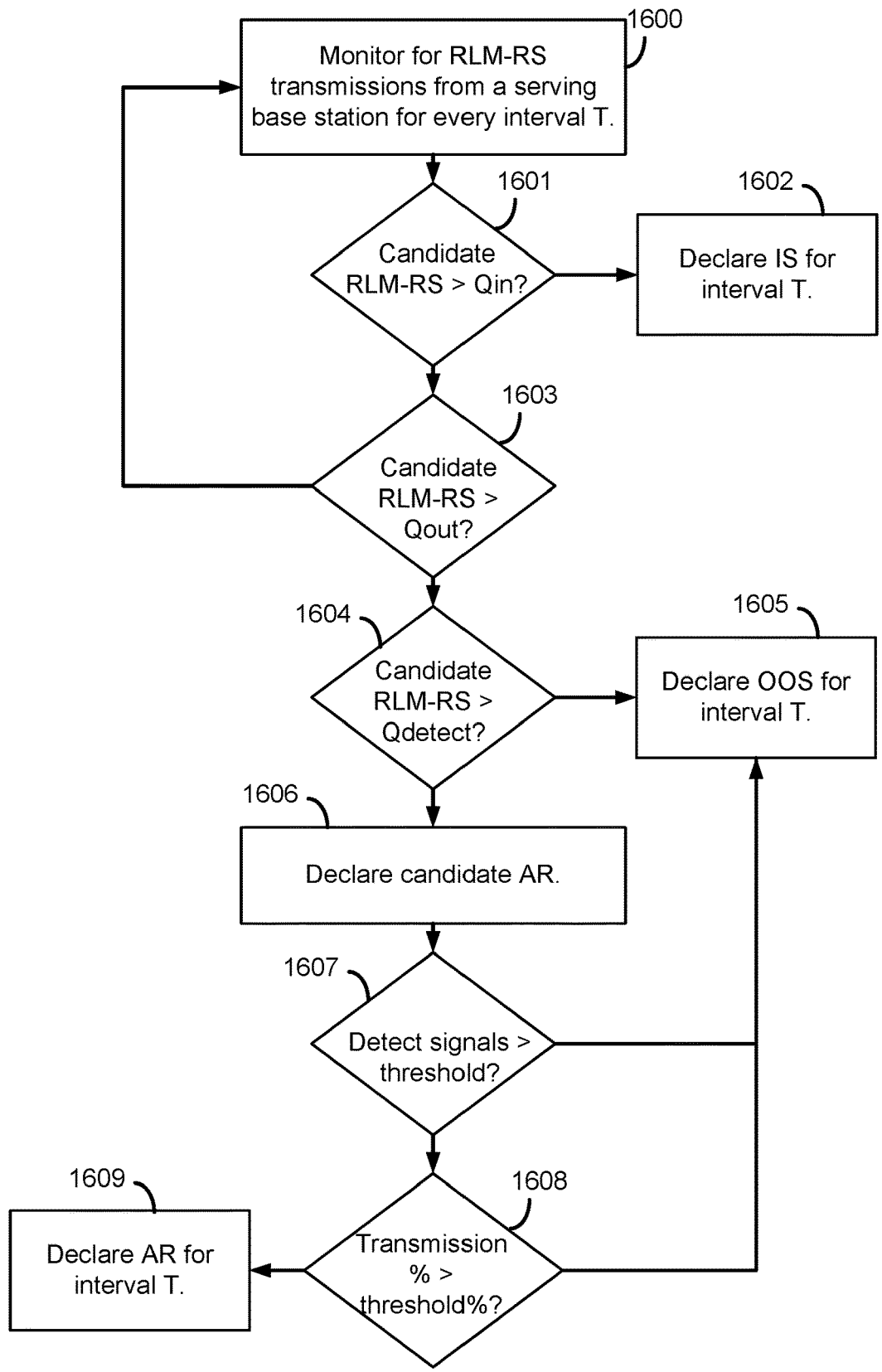
FIG. 16 is a block diagram illustrating example blocks executed to implement one aspect of the present disclosure.

It should be noted that determination of the absence of RLM-RS (AR) indication is illustrated and described in greater details with regard to FIG. 16. UE 115 performs a series of measurements on candidate RLM-RS signals based on the signal strength of the candidate RLM-RS in order to determine whether a failure to receive the RLM-RS of a threshold signal strength is an absence of the signal (e.g., and AR) or reflects an out-of-synchronization (OOS) condition. UE 115 may perform additional calculations and comparisons to make the determination of whether a failure to receive condition reflects either an AR condition, after which an AR indication may be generated, or reflects an OOS condition, after which an OOS indication may be generated. Such AR or OOS indications may be included in such failure reports to base station 105. Where UE 115 identifies $N_{Fail}$ consecutive Out of Sync (OOS) indications, UE 115 may transmit the failure report. Base station 104 uses this failure report to initiate scheduling of additional RLM-RS. For example, after failing to detect RLM-RS opportunities at 1105 and 1106, UE 115 transmits a failure report at 1102. The failure report triggers base station 105 to initiate default plus additional RLM period 1103, within which both additional and default RLM-RS transmission opportunities are attempted.

Once the default plus additional RLM period 1103 is initiated, observance of more favorable link conditions by UE 115 may lead to ending such default plus additional RLM period 1103 and returning to monitoring only the default RLM-RS resources. When detecting such favorable link conditions, UE 115 may transmit a recovery report based on various different criteria reflecting the more favorable link condition. For example, UE 115 may transmit the recovery report when the RLF timer is stopped following observance of such favorable link criteria. Additionally, UE 115 may transmit the recovery report when at least a predefined number, $N_{Success}$, indications, excluding absence of RLM-RS indication, are received within a predefined time period. Further, when UE 115 receives $N_{Success}$ consecutive In-Sync (IS) indications, UE 115 may transmit the recovery report. Such recovery reporting can be configured regardless of whether additional RLM-RS have been configured. Base station 105 would use the recovery report to stop scheduling of the additional RLM-RS. For example, after UE 115 receives additional indications with the successful transmissions of both default and additional RLM-RS within default plus additional RLM period 1103, UE 115 transmits a recovery report at 1104. Base station 105 uses the recovery report to then end default plus additional RLM period 1103 and return to transmitting default RLM-RS.

It should be noted that base station 105 and the network may use the failure report and recovery reports to optimize the connection with UE 115. Base station 105 may further use these reports for transmission of other signals as well, such as DM-RS, PDCCH, and the like.

Figure 12:
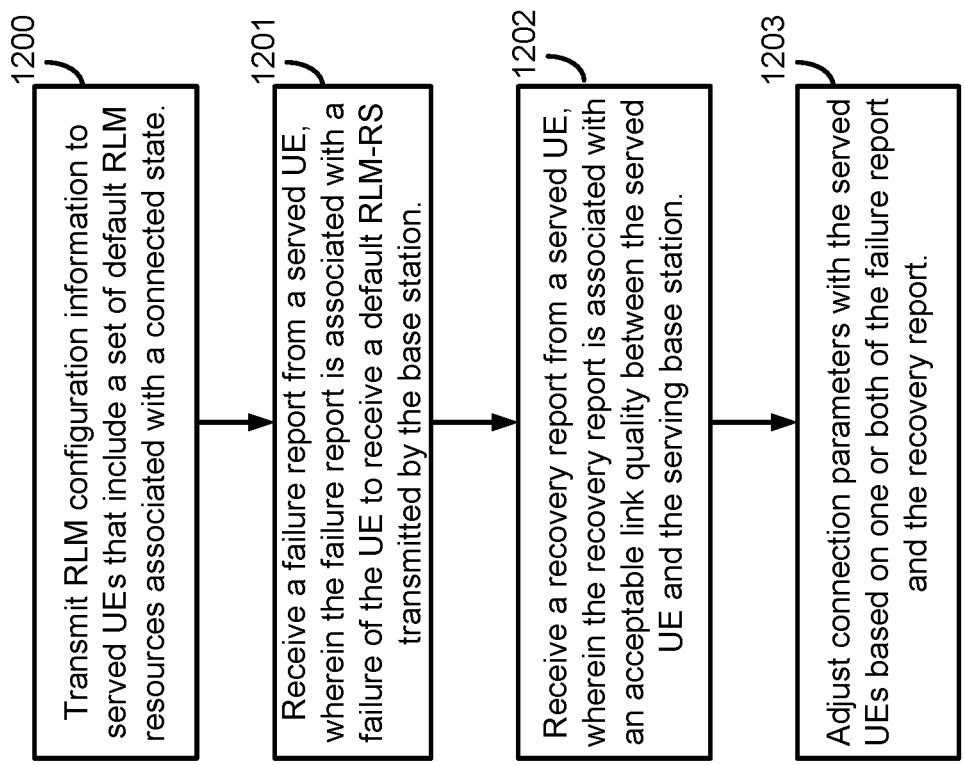
FIG. 12 is a block diagram illustrating example blocks executed to implement one aspect of the present disclosure.

FIG. 12 is a block diagram illustrating example blocks executed to implement one aspect of the present disclosure. The example blocks will also be described with respect to base station 105 as illustrated in FIG. 20.

At block 1200, a base station transmits RLM configuration information to one or more served UEs, wherein the RLM configuration information includes a set of default RLM resources associated with a connected state of the one or more served UEs. As noted above, base station 105, as configured according to the aspects of the present disclosure, would include RLM logic 2001, which includes the functionalities identified in the various aspects of the present disclosure defining operations with default and additional RLM-RS. Base station 105, under control of controller/processor 240, executes RLM logic 2001. The execution environment of RLM logic 2001 allows base station 2001 to determine RLM configuration information that includes allocation of default RLM-RS resources. Such configuration information may be stored in memory 242 at RLM configuration 2002. The execution environment of RLM logic 2001 provides for base station 105, under control of controller/processor 240, to transmit the RLM configuration information, including configuration for default RLM-RS resources, to served UEs via wireless radios 2000*a*-*t* and antennas 234*a*-*t*. The RLM configuration information may also include identification of additional RLM-RS resources. However, the example implementation illustrated in FIG. 12 does not rely on configuration of additional RLM-RS resources.

At block 1201, the base station receives a failure report from the one or more served UEs, wherein the failure report is associated with a failure of the one or more served UEs to receive a default RLM-RS transmitted by the base station. Base station 105 may receive a failure report from a served UE via antennas 234*a*-*t* and wireless radios 2000*a*-*t*. The failure report may contain identification of various observed failure criteria that may be stored or match the stored pre-defined criteria at failure criteria 2003. The criteria identified within failure criteria 2003 may then be accessed by base station 105 to determine when a failure condition may have occurred. As noted in previous examples, a failure criteria may include an RLF timer activated due to detection of excessive interference or failure to accurately demodulator or decode received signals. Similarly, a failure criteria may be identified by a threshold number of AR indications within a specific time period. Additionally, a failure criteria may be identified by a threshold number of consecutive OOS indication, caused by observation of out-of-synchronization conditions.

At block 1202, the base station receives a recovery report from the one or more served UEs, wherein the recovery report is associated with an acceptable link quality between the one or more served UEs and the serving base station. Base station 105 may receive a recovery report from a served UE via antennas 234*a*-*t* and wireless radios 2000*a*-*t*. The recovery report may contain identification of various observed recovery criteria that may be stored or match the stored pre-defined criteria at recovery criteria 2004. The criteria identified within recovery criteria 2004 may then be accessed by base station 105 to determine when a recovery condition may have occurred. As noted in previous examples, a recovery criteria may be triggered on detecting that a running RLF timer has been stopped or deactivated due to detection of favorable link conditions. Similarly, a recovery criteria may be identified by a threshold number of indications, other than AR indication, that suggest a favorable link condition within a specific time period. Additionally, a recovery criteria may be identified by a threshold number of consecutive IS indications, caused by observation of in-synchronization conditions.

At block 1203, the base station adjusts connection parameters with the one or more served UEs based on one or both of the failure report and the recovery report. As each of the failure and recovery reports includes feedback from the served UEs on the link quality or condition, base station 105, under control of controller/processor 240, may use the information to adjust channel or connection parameters via wireless radios 2000*a*-*t* for improving the connection to the served UEs.

Figure 13:
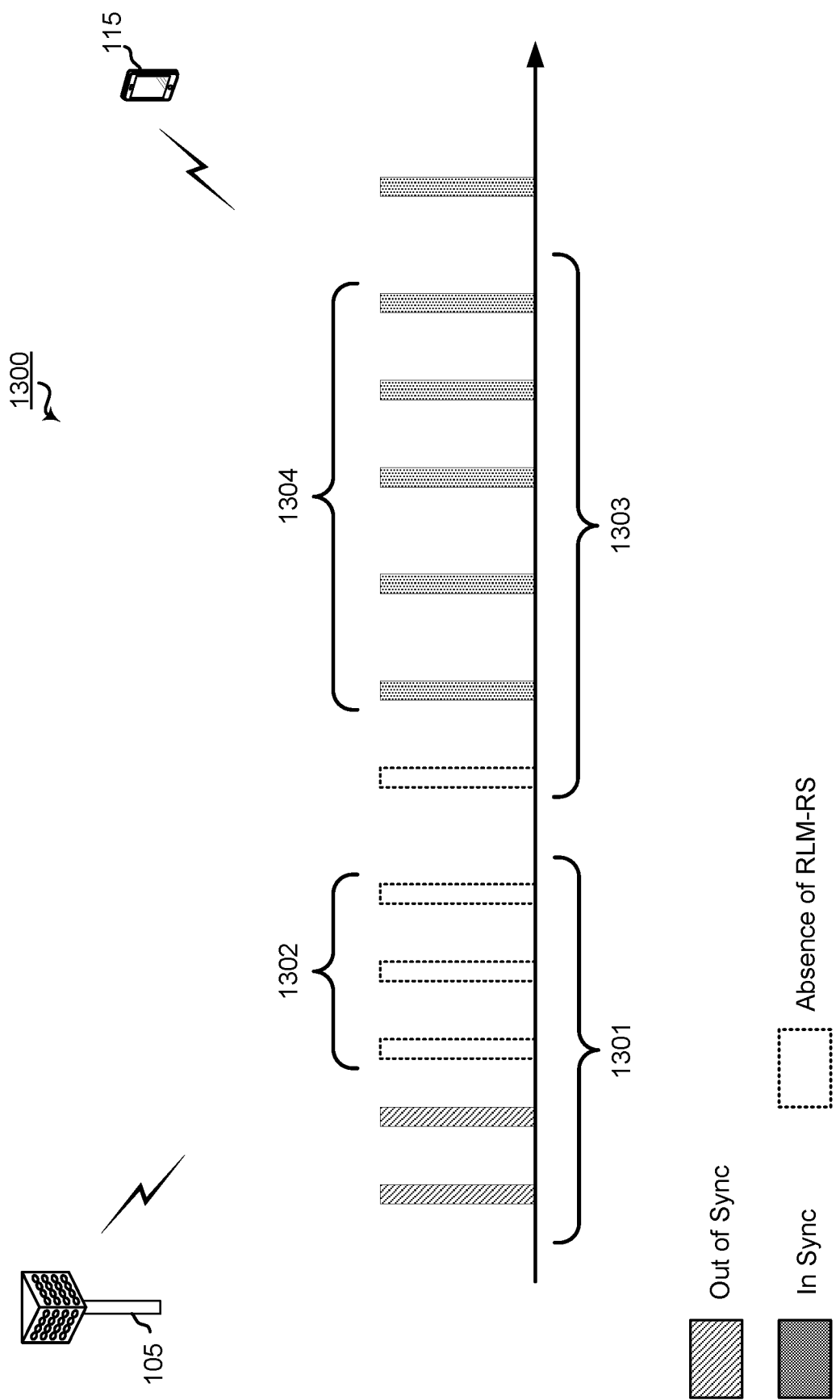
FIG. 13 is a block diagram illustrating a portion of an NR-U network in which a base station and UE perform communications according to one aspect of the present disclosure.

FIG. 13 is a block diagram illustrating a portion of NR-U network 1300 in which base station 105 and UE 115 perform communications according to one aspect of the present disclosure. According to additional aspects of the present disclosure, as illustrated and described with respect to FIG. 13, UE 115 may autonomously initiate monitoring scheduled additional RLM-RS opportunities based on different observed criteria. UE 115 would initially receive an RLM configuration from base station 105 that includes the configuration of additional RLM-RS resources. As UE 115 detects an autonomous criteria, it would then initiate monitoring such additional RLM-RS resources for transmissions. In a first example implementation, autonomously triggering additional RLM monitoring may be based on RLF timer. When the RLF timer is not running at UE 115, UE 115 would perform RLM measurements using the configured default RLM-RS resources. However, when the RLF timer is triggered, UE 115 may begin performing RLM measurements on both the configured default and additional RLM-RS resources.

In a second example implementation, UE 115 may initiate additional RLM-RS resource monitoring based on detection of RLM-RS. UE 115 would perform RLM measurements on both default and additional RLM-RS resource when a predetermined number, $N_{Fail}$, of absence of RLM-RS (AR) indications are identified within a predefined period of time period (as illustrated and described in greater detail in FIG. 16). In contrast, UE 115 may autonomously perform RLM measurements on only default RLM-RS resources when at least a predetermined number, $N_{Success}$, of indications other than AR indications, are identified at UE 115 within a given time period.

In a third example implementation, UE 115 may initiate additional RLM-RS resource monitoring based on OOS indications. For example, UE 115 may autonomously perform RLM measurements on both default and additional RLM-RS resources when a predetermined number, $N_{Fail}$, of consecutive OOS indications are identified at UE 115. Conversely, UE 115 may autonomously perform RLM measurements on only the default RLM-RS resources when a predetermined number, $N_{Success}$, of consecutive IS indications are identified at UE 115.

For example, as illustrated in FIG. 13, during default RLM period 1301, UE 115 autonomously detects a criteria indicating a failure to receive default RLM-RS over default period 1302. Such criteria may include any of the described criteria above, including identifying $N_{Fail}$ AR indications. Detection of the failure criteria over default period 1302 may autonomously trigger UE 115 to begin performing RLM measurements of both default and additional RLM-RS resources within default plus additional RLM period 1303. UE 115 may further autonomously observe recovery criteria within recovery period 1304. The recovery criteria may include any of the criteria discussed above, including the receipt by UE 115 of $N_{Success}$ consecutive IS indications. Once such recovery criteria is observed by UE 115, UE 115 may autonomously begin monitoring only the default RLM-RS resources.

Figure 14:
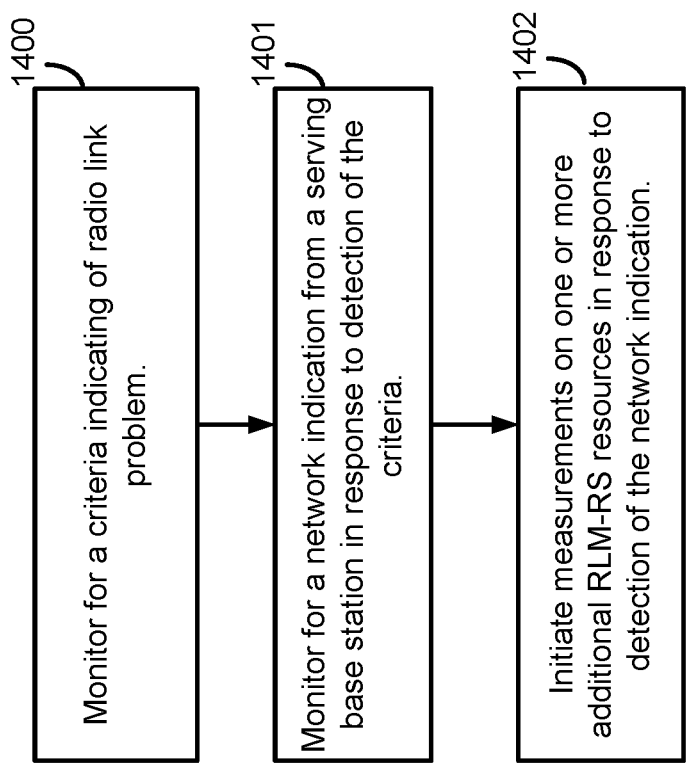
FIG. 14 is a block diagram illustrating example blocks executed to implement one aspect of the present disclosure.

FIG. 14 is a block diagram illustrating example blocks executed to implement one aspect of the present disclosure. The example blocks will also be described with respect to UE 115 as illustrated in FIG. 19.

At block 1400, a UE monitors for a criteria indicating of radio link problem. The criteria identified within failure criteria 1904 may be accessed by UE 115 to determine when failure criteria have occurred. As noted in previous examples, UE 115 may monitor for the pre-defined failure criteria, such as an activated RLF timer, a threshold number of AR indications within a specific time period, or a threshold number of consecutive OOS indication, caused by observation of out-of-synchronization conditions at UE 115.

At block 1401, the UE monitors for a network indication from a serving base station in response to detection of the criteria. UE 115, according to the aspects of the present disclosure, would, under control of controller/processor 280, execute RLM logic 1902. The execution environment of RLM logic 1902 prompts UE 115 to monitor for the network indication from the serving base station after detecting any of the pre-defined failure criteria from block 1400. The functionality included within the execution environment of RLM logic 1902 provides for UE 115, under control of controller/processor 280, to monitor the signals detected via antennas 252a-r and wireless radios 1900a-r for the network indication.

At block 1402, the UE initiates measurements on one or more additional RLM-RS resources in response to detection of the network indication. The network indication received by UE 115 from the serving base station may trigger UE 115 to begin monitoring both default and additional RLM-RS. Within the execution environment of RLM logic 1902, UE 115 is instructed to begin monitoring the additional RLM-RS resources for RLM-RS from the serving base station in addition to monitoring the default RLM-RS resources. Upon detecting the failure criteria at block 502, functionality within the execution environment of RLM logic 1902 causes UE 115, under control of controller/processor 280 to indicate to wireless radios 1900a-r to tune to the additional RLM-RS resources and begin monitoring for additional RLM-RS from the serving base station.

Figure 15:
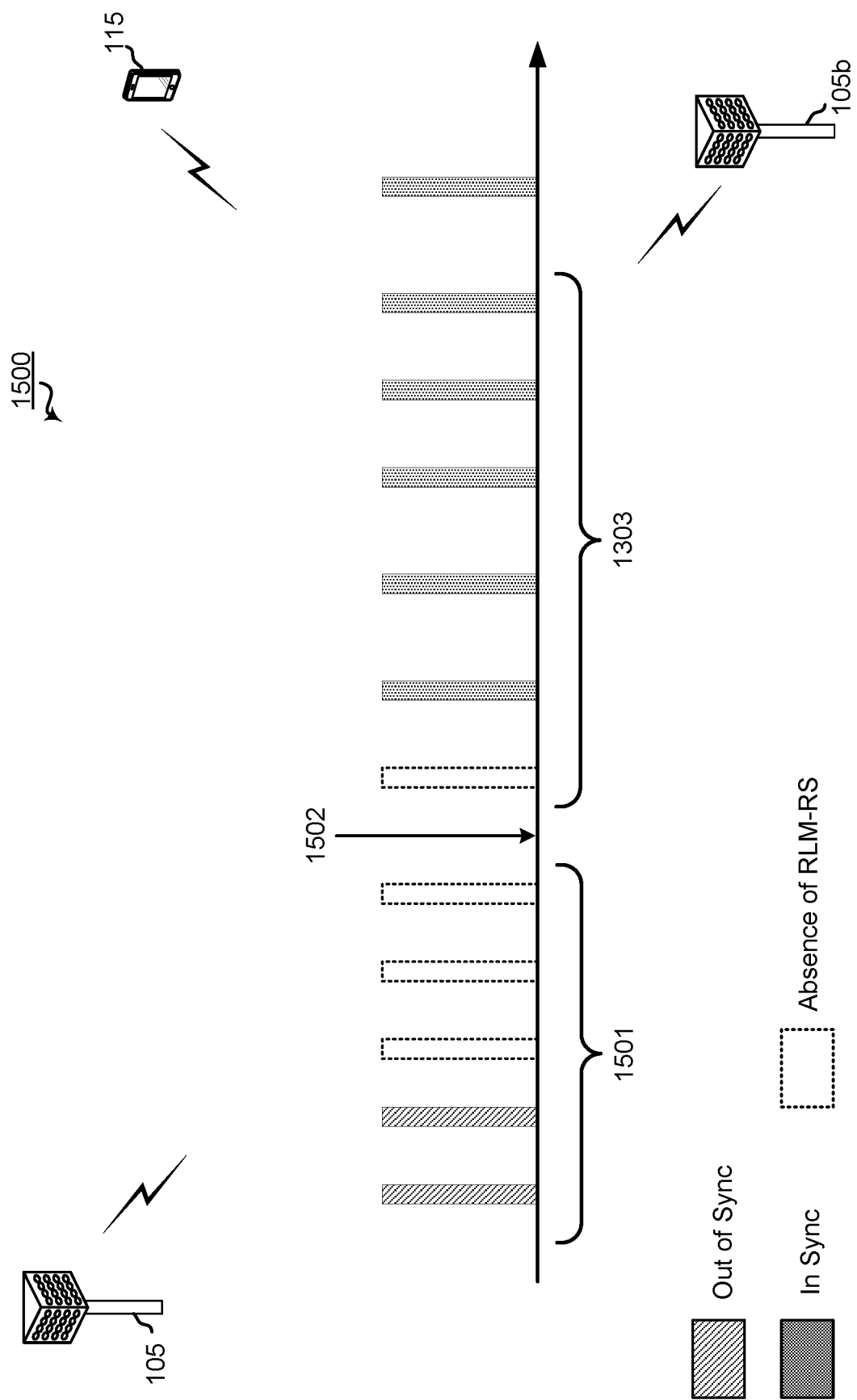
FIG. 15 is a block diagram illustrating a portion of an NR-U network in which a base station and UE perform communications according to one aspect of the present disclosure.

FIG. 15 is a block diagram illustrating a portion of NR-U network 1500 in which base station 105 and UE 115 perform communications according to one aspect of the present disclosure. According to additional aspects of the present disclosure, as illustrated and described with respect to FIGS. 14 and 15, UE 115 may autonomously initiate monitoring scheduled additional RLM-RS opportunities based on received network indications. UE 115 would look for network indications based on a various pre-defined criteria. For example, such criteria may include running of the RLF timer at UE 115 or reaching a predefined number of OOS or AR indications determined and identified by UE 115. In one example implementation, during default RLM period 1501, UE 115 determines multiple OOS indicators and multiple AR indicators. At 1502, UE 115 receives a network indication to begin monitoring additional RLM-RS resources. In this first example implementation, base station 105 may transmit the network indication at 1502. In another example implementation, the network indication at 1502 may be provided through a different cell (e.g., from base station 105b) than the cell of base station 105 for which RLM is performed. When the above failure criteria are met (e.g., UE 115 identifying the running of the RLF timer or identifying a certain number of OOS or AR indications), UE 115 may then perform PDCCH monitoring irrespective of any discontinuous reception (DRX) configuration or attempts to decode downlink control information (DCI) or media access control (MAC) control elements (CEs) associated with the network indication at 1502.

UE 115 may then begin monitoring additional RLM-RS resources after receiving the network indication at 1502 activating the RLM-RS resources. The network indication at 1502 may provide information on which RLM-RS resources are activated/deactivated and which resources should be monitored by UE 115. The network indication at 1502 may also include a time duration for which the RLM-RS resource(s) is activated. Thus, the network indication at 1502 may provide a time duration or timer length for default plus additional RLM-RS period 1303. UE 115 would then monitor the default and additional RLM-RS resources until the time duration or timer of the activated resources of default plus additional RLM-RS period 1303 ends.

In NR systems, radio link failure detection may be based on in-sync (IS) and out-of-sync (OOS) state detection. An OOS state may be determined when all RLM-RS resources have a signal strength less than a minimum threshold value, $Q_{out}$, during an evaluation period. An IS state may be determined when at least one RLM-RS resource has a signal strength greater than a threshold value, $Q_{in}$, during the evaluation period. A UE may trigger its RLF timer when the UE receives a certain threshold number, $N_{OOS}$, of consecutive OOS indications. The UE may also stop the RLF timer if it receives a threshold number, $N_{IS}$, of consecutive IS indications. When the RLF timer continues to expiration, the UE may terminate the connection from the current cell and perform cell reselection.

As indicated in various examples of the aspects of the present disclosure described herein, UE 115 may identify or determine an AR based on analysis of signals that may be potential or candidate RLM-RS. UE 115 may use a measurement process of these candidate signals to determine whether an RLM-RS is, in fact, received, whether there is an absence of the RLM-RS (e.g., the AR), or whether the link is OOS.

FIG. 16 is a block diagram illustrating example blocks executed to determine an absence of RLM-RS (AR) according to various aspects of the present disclosure. The example blocks will also be described with respect to UE 115 as illustrated in FIG. 19.

At block 1600, at UE monitors for RLM-RS transmissions from a serving base station for every interval, T. UE 115, under control of controller/processor 280, executes RLM logic 1902, in memory 282. The execution environment of RLM logic 1902 provides UE 115 with the functionality for monitoring the radio link both using default and additional RLM-RS resources. Using the RLM configuration information stored at RLM configuration 1903, UE 115, under control of controller/processor 280, inspects signals received via antennas 252a-r and wireless radios 1900a-r that are detected during configured RLM-RS resources to determine whether such signals are RLM-RS, whether default RLM-RS or additional RLM-RS.

At block 1601, a determination is made whether the measured signal strength of any candidate RLM-RS signal received is greater than a threshold in-synchronization signal strength, $Q_{in}$. UE 115, under control of controller/processor 280, executes AR detection logic 1907, stored in memory 282. The execution of AR detection logic 1907 prompts UE 115, under control of controller/processor 280, to execute measurement logic 1904, which provides the functionality for measuring the signal strength of candidate signals. If the signal strength of the candidate RLM-RS signal is greater than the threshold, $Q_{in}$, then, at block 1602, the UE declares an in-synchronization (IS) condition for the interval, T. Within the execution environment of AR detection logic 1907, when the results of the measurements indicate that the candidate signal's strength is at least $Q_{in}$, the functionality provides for UE 115 to declare an IS condition for the interval.

At block 1603, if the signal strength of the candidate RLM-RS is not greater than $Q_{in}$, as determined at block 1601, then the UE makes a further determination whether the measured signal strength of any candidate RLM-RS signal received is greater than a threshold out-of-synchronization (OOS) signal strength, Qout. Further within the execution environment of measurement logic 1901, the signal strength of the candidate signal is checked against Qout. If the signal strength of the candidate RLM-RS signal is greater than the threshold, Qout, then, the UE moves to the next interval and begins monitoring for RLM-RS transmissions again at block 1600. The functionality provided by the execution environment of AR detection logic 1907 instructs UE 115 to move the next interval to monitor for the next potential RLM-RS.

At block 1604, if the signal strength of the candidate RLM-RS is not greater than Qout, as determined at block 1603, then the UE makes a further determination whether the measured signal strength of any candidate RLM-RS signal received is greater than a threshold detection signal strength, Qdetect. Further within the execution environment of measurement logic 1901, the signal strength of the candidate signal is checked against Qdetect. If the signal strength of the candidate RLM-RS signal is greater than the threshold, Qdetect, then, at block 1605, the UE declares an OOS condition for the interval, T. Within the execution environment of AR detection logic 1907, when the results of the measurements indicate that the candidate signal's strength is at least Qdetect, the functionality provides for UE 115 to declare an OOS condition for the interval.

At block 1606, if the signal strength of the candidate RLM-RS is not greater than Qdetect, as determined at block 1604, then the UE declares the candidate RLM-RS to be a candidate AR. Within the execution environment of AR detection logic 1907, when the results of the measurements indicate that the candidate signal's strength does not meet the Qdetect threshold, the functionality provides for UE 115 to declare the candidate signal a candidate AR.

At block 1607, a determination is made whether the UE has detected a threshold number of serving cell signals. Within the execution environment of AR detection logic 1907, UE 115 attempts to detect any serving cell signals via antennas 252a-r and wireless radios 1900a-r. If UE 115 detects a number of serving cell signals that is exceeds the threshold number of signals, then the functionality provided within the execution environment of AR detection logic 1907 prompts UE 115 will declare an OOS condition for interval, T, at block 1605.

At block 1608, if UE 115 has not detected a number of serving cell signals exceeding the threshold number of signals, as determined at block 1607, then the execution environment of AR detection logic 1907 provides for UE 115 makes another determination whether the base station has transmitted a threshold transmission percentage of RLM-RS over a predetermined number of previous RLM-RS occasions. The operation of block 1608 is contingent on UE 115 receiving a network status report from the serving base station the identifies the number of actual RLM-RS transmissions made by the serving base station over a given prior time period. UE 115 would receive such network status report via antennas 252a-r and wireless radios 1900a-r. If UE 115 determines, according to the functionality provided in the execution environment of AR detection logic 1907, that the serving base station has transmitted at least a number of RLM-RS transmissions that exceeds the threshold transmission percentage, then, UE 115 will declare an OOS condition for the interval, T, at block 1605.

At block 1609, if UE 115 determines that the serving base station has not transmitted at least the threshold transmission percentage number of RLM-RS transmissions, as determined at block 1608), then the functionality within the execution environment of AR detection logic 1907 provides for UE 115 to declare an AR condition and determines that the candidate AR is, in fact an AR for the interval, T.

It should be noted that if UE does not receive a network status report from the serving base station that the UE would declare the AR condition according to block 1609 directly from the negative determination related to block 1607.

Figure 17:
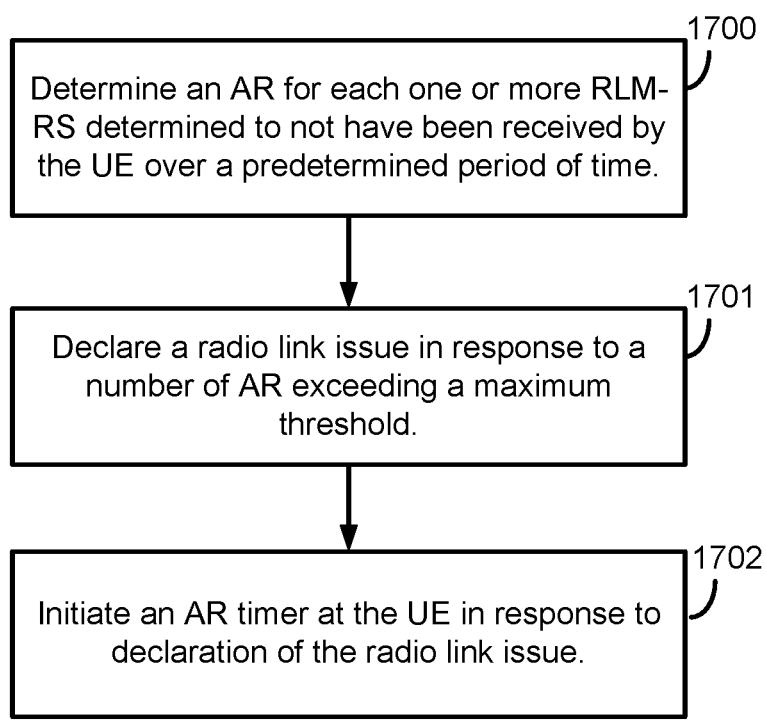
FIG. 17 is a block diagram illustrating example blocks executed to implement one aspect of the present disclosure.

FIG. 17 is a block diagram illustrating example blocks executed to implement one aspect of the present disclosure. The example blocks will also be described with respect to UE 115 as illustrated in FIG. 19.

At block 1700, a UE determines a candidate AR has been determined for each one or more RLM-RS determined to not have been received by the UE over a predetermined period of time. UE 115, under control of controller/processor 280, executes AR detection logic 1907, in memory 282. The execution environment of AR detection logic 1907 provides UE 115 with the functionality to determine the candidate ARs for potential RLM-RS that may not have been received by UE 115.

At block 1701, the UE declares a radio link issue in response to a number of AR exceeding a maximum threshold over the predetermined period of time. Within the execution environment of AR detection logic 1907, UE 115 will declare a radio link issue when the number of ARs identified by UE 115 exceeds a threshold value. The declaration of the radio link issue prompts UE 115 to execute, under control of controller/processor 280, radio link issue logic 1909.

At block 1702, the UE initiates an AR timer at the UE in response to declaration of the radio link issue. Within the execution environment of AR detection logic 1907, when the number of ARs is determined to exceed the threshold, UE 115, under control of controller/processor 280, executes AR timer 1908. Within the execution environment of radio link issue logic 1909, UE 115 monitors for conditions that may reveal an improved link quality with the serving base station. Where such recovery conditions are detected, UE 115, within the functionality provided by radio link issue logic 1909, may deactivate or stop AR timer 1908. If no such recovery conditions are detected, then AR timer may continue to its conclusion.

Figure 18:
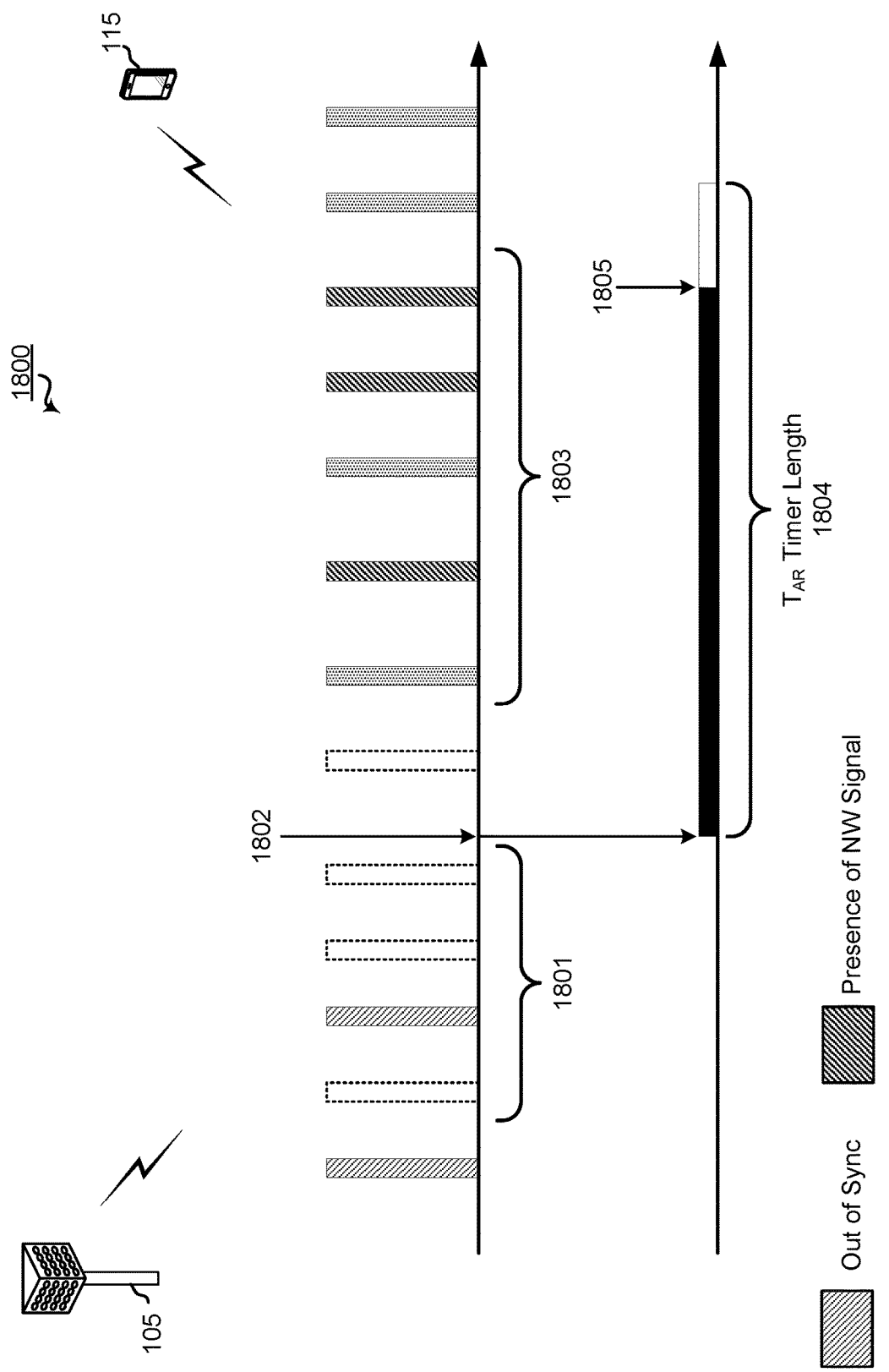
FIG. 18 is a block diagram illustrating a portion of an NR-U network in which a base station and UE perform communications according to one aspect of the present disclosure.

FIG. 18 is a block diagram illustrating a portion of NR-U network 1800 in which base station 105 and UE 115 perform communications according to one aspect of the present disclosure. According to additional aspects of the present disclosure, as illustrated and described with respect to FIGS. 17 and 18, a UE, such as UE 115, may determine that there is a radio link problem based on the identification of AR indications. The AR indications may occur, as illustrated and described in FIG. 16, when UE 115 is not able to receive any RLM-RS transmission that have a signal strength greater than a threshold, $Q_{detect}$, within an evaluation period. As noted above, the detection of a potential AR may be further evaluated for escalation of the candidate AR to an actual OOS indication. The evaluation of candidate ARs to determine whether an AR condition or OOS condition is more likely may be performed using an additional consideration of a probability. The value of this probability may be based on any various different criteria. For example, the probability may be based on the candidate RLM-RS signal strength in the previous evaluation period—an increase in RLM-RS signal strength may reduce the probability that a candidate AR, in fact, indicates an OOS state. An additional criteria may include the number of AR or candidate AR indications that UE 115 has identified consecutively—here, an increase in the number of AR indications identified may increase the probability that the candidate AR indicates an OOS condition and, thus, an OOS state. Further criteria may include the number of LBT failures experienced at UE 115—an increase in the number of LBT failures at UE 115 reduces the probability that the candidate AR indicates an OOS condition.

UE 115 may also evaluate radio link problems based on detection of other network signals within the DMTC. For example, if UE 115 detects a serving cell signal (e.g., DM-RS/PDCCH/PDSCH) in more than a threshold percentage, X %, of DMTC occasions within a given time period, then UE 115 may assume an OOS indication. Otherwise, UE 115 assumes the candidate AR reflects an AR condition and is not indicative of an OOS condition (e.g., by, for example, assuming IS was not detected by UE 115).

UE 115 may also evaluate radio link problems based on a network status report of RLM-RS transmission. For a set of RLM-RS opportunities, the network, via base station 105, transmits an indication of a list of previous instances where base station 105 was not able to transmit the given RLM-RS(s). If base station 105 has transmitted RLM-RS in more than a threshold percentage, X %, of RLM-RS occasions within a time period, then UE 115 assumes the candidate AR reflects an OOS condition; otherwise UE 115 may assume the candidate AR reflects an AR condition (e.g., again, by assuming UE 115 did not detect IS).

It should be noted that X % may be selected as a low percentage, such as 0%, 5%, 10%, and the like. In an ideal system, detection of any serving cell signals or confirmed transmissions of any RLM-RS should indicate an AR condition (e.g., X %=0%) and not an OOS condition. However, real system implementations may benefit from a small percentage between 0% and 10%.

In additional aspects, UE 115 may consider a radio link problem if UE 115 identifies a threshold number, $N_{AR}$, of AR indications within a given period. UE 115 may then initiate a timer (timer $T_{AR}$) upon detection of radio link problem using any of the described evaluation means. For example, UE 115 detects three AR indications within evaluation period 1801 of FIG. 18. Using this evaluation method, UE 115 would then trigger timer, $T_{AR}$, at 1802, which has a predetermined length 1804.

When timer $T_{AR}$ is running, UE 115 attempts to decode network signals, e.g., DM-RS or PDCCH or other similar transmissions from base station 105. If UE 115 is able to detect a serving cell transmission during a predetermined time duration 1803, it is considered to be a presence of network signal (PN) indication. UE 115 stops the timer $T_{AR}$ if it receives a pre-defined number, $N_{PN-AR}$, of PN and/or In-Sync (IS) indications from base station 105 within a given period. For example, over predetermined time duration 1803, UE 115 identifies an $N_{PN-AR}$ of five: three PN indications and two IS indications, from base station 105. These five indications exceed the example threshold, $N_{PN-AR}$, Of FIG. 18, thus, triggering UE 115 to stop timer, $T_{AR}$, at 1805 prior to the full length 1804 of $T_{AR}$.

It should be noted that, where timer, $T_{AR}$, expires after reaching its full length 1804, or if timer, $T_{AR}$, is not configured, then UE 115 may determine a radio link problem. In a first optional aspect, upon determining the radio link problem, UE 115 may initiate the radio link failure procedure. In a second optional aspect, upon determining the radio link problem, UE 115 may initiate a random access procedure. With initiating the random access procedure, UE 115 would have previously received a RACH resource configuration, including a set of preamble, RACH parameters, LBT parameters, and the like, which UE 115 would use for the random access procedure. In certain aspects of the present disclosure, the random access resources (e.g., preamble and random access occasions) received by UE 115 may be specifically configured for AR timer recovery. Thus, base station 105 would provide RACH configurations that includes normal random access resources and AR timer-specific random access resources.

According to the random access procedure, UE 115 may receive a RAR from base station 105 corresponding to the PRACH transmitted by UE 115 (RA-RNTI according to the RACH occasion selected and RAPID the same as preamble transmitted by UE). When such random access messages are sent and received as expected, UE 115 may then consider the random access procedure successfully completed and continue normal operation. However, if the random access procedure fails, UE 115 may then declare radio link failure and initiate the radio link failure procedure.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5, 8, 10, 12, 14, 16, and 17 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, at a user equipment (UE), radio link monitoring (RLM) configuration information including a set of default RLM resources associated with a connected state of the UE and a set of additional RLM resources associated with one or more pre-defined criteria;
   monitoring, by the UE, the set of default RLM resources for a default RLM reference signal (RLM-RS) from a serving base station during the connected state;
   observing, by the UE, a pre-defined criteria of the one or more pre-defined criteria; and
   monitoring, by the UE in response to the pre-defined criteria, the set of additional RLM resources for an additional RLM-RS.

2. The method of claim 1, wherein the RLM configuration includes a first downlink bandwidth part (BWP) identifier (ID) identifying allocation of the set of default RLM resources to an active bandwidth part (BWP) of a channel bandwidth, and a second downlink BWP ID identifying allocation of the set of additional RLM resources to a non-active BWP of the channel bandwidth.

3. The method of claim 2, wherein the monitoring the set of additional RLM resources includes:
   tuning to the non-active BWP during a measurement gap from the active BWP; and
   measuring one or more signals within the set of additional RLM-RS resources for detection of the additional RLM-RS.

4. The method of claim 3, further including one of:
   autonomously selecting, by the UE, the measurement gap; or
   receiving, by the UE, identification of the measurement gap from the serving base station, wherein the measurement gap is designated for RLM measurements.

5. The method of claim 1, wherein the additional RLM-RS includes a set of synchronization signal blocks (SSBs).

6. The method of claim 5, further including one or more of:
receiving, by the UE, discovery reference signal (DRS) measurement timing configuration (DMTC) configuration including at least a time-frequency resource of the set of SSBs and one or more transmission parameters of the SSBs;
receiving, by the UE, a physical cell ID (PCI) associated with the additional RLM-RS; and
receiving, by the UE, a power offset for each SSB of the set of SSBs, wherein the power offset is relative to a cell-defining SSB of the serving base station.

7. The method of claim 5, wherein the set of SSBs for the additional RLM-RS and a set of default SSBs for the default RLM-RS are indexed according to one of:
a same set of SSB indices, or
a set of default SSB indices and a set of additional SSB indices independent of the set of default SSB indices.

8. The method of claim 7, wherein a quasi-co-location relation between the set of default SSB indices and the set of additional SSB indices is one of:
identified in a configuration message received by the UE from the serving base station, or
deemed by the UE as quasi-co-located for a same SSB index value between the set of default SSB indices and the set of additional SSB indices when not identified in the configuration message.

9. The method of claim 1, wherein the set of additional RLM-RS resources includes a set of channel state information reference signals (CSI-RS) resources, wherein the set of CSI-RS resources include one of: static CSI-RS resources, semi-static CSI-RS resources, or dynamic CSI-RS resources.

10. The method of claim 9, further including:
receiving, by the UE, a control activation signal from the serving base station triggering one of: the semi-static CSI-RS resources, or the dynamic CSI-RS resources, wherein the monitoring the set of additional RLM resources is in response to the control activation signal.

11. The method of claim 1, wherein the observing the pre-defined criteria includes one of:
identifying, by the UE, activation of a radio link failure (RLF) timer at the UE;
determining, by the UE, a number of absence of RLM-RS indications received by the UE within a predetermined period of time exceeds a failure threshold; or
determining, by the UE, a number of consecutive out of synchronization (OOS) indications received by the UE exceed the failure threshold.

12. The method of claim 11, further including:
monitoring, by the UE, for one or more pre-defined recovery criteria after initiating the monitoring the additional RLM resources; and
ceasing, by the UE, the monitoring the additional RLM resources in response to detection of the one or more pre-defined recovery criteria.

13. The method of claim 12, wherein the detection of the one or more pre-defined recovery criteria includes one of:
identifying, by the UE, deactivation of a radio link failure (RLF) timer at the UE;
determining, by the UE, a number of successful transmission reception indications received by the UE within a predetermined period of time exceeds a success threshold; or
determining, by the UE, a number of consecutive in synchronization (IS) indications received by the UE exceeds the success threshold.

14. The method of claim 1, wherein the observing the pre-defined criteria includes:
detecting, by the UE, a link issue criteria associated with a link quality between the UE and the serving base station; and
receiving, by the UE, a network indication in response to the link issue criteria, wherein the network indication represents the pre-defined criteria observed by the UE.

15. The method of claim 14, wherein the network indication is received from one of:
the serving base station; or
a neighboring base station from a cell different that the serving base station.

16. The method of claim 14, wherein the detecting the link issue criteria include one or more of:
identifying, by the UE, activation of a radio link failure (RLF) timer at the UE;
determining, by the UE, a number of absence of RLM-RS indications received by the UE within a predetermined period of time exceeds a failure threshold; or
determining, by the UE, a number of consecutive out of synchronization (OOS) indications received by the UE exceed the failure threshold.

17. The method of claim 14, wherein the network indication includes one or more of:
identification of activated and deactivated RLM-RS resources within the set of additional RLM-RS resources;
identification of one or more RLM-RS resources within the set of additional RLM-RS resources to be monitored by the UE; and
a time duration for the activated RLM-RS resources.

18. A method of wireless communication, comprising:
transmitting, by a base station, radio link monitoring (RLM) configuration information to one or more served UEs, wherein the RLM configuration information includes a set of default RLM resources associated with a connected state of the one or more served UEs and a set of additional RLM resources associated with one or more pre-defined criteria;
monitoring, by the base station, for the one or more pre-defined criteria over a first predetermined time;
scheduling, by the base station, transmission of additional RLM reference signals (RLM-RS) using the set of additional RLM resources in response to detection of a pre-defined criteria of the one or more pre-defined criteria within the first predetermined time;
monitoring, by the base station after the scheduling, for one or more pre-defined recovery criteria over a second predetermined time; and
ceasing, by the base station, the scheduling in response to detection of one or more pre-defined recovery criteria within the second predetermined time.

19. The method of claim 18, wherein the one or more pre-defined criteria include detected failure of listen before talk (LBT) procedures performed for each default RLM-RS attempted for transmission using the set of default RLM resources, and the one or more pre-defined recovery criteria include successful transmission of the each default RLM-RS and the additional RLM-RS.

20. The method of claim 19,
wherein the detection of the pre-defined criteria includes:
  determining a number of failures of the LBT procedures within the first predetermined time exceeds a failure threshold, and
wherein the detection of the one or more pre-defined recovery criteria includes:
  determining a number of successful transmissions of the each default RLM-RS and the additional RLM-RS within the second predetermined time exceeds a success threshold.

21. The method of claim 18, wherein the one or more pre-defined criteria include detected failure of channel acquisition during a discovery reference signal (DRS) measurement timing configuration (DMTC), and the one or more pre-defined recovery criteria include successful channel acquisition for DRS transmission within the DMTC.

22. The method of claim 21,
wherein the detection of the pre-defined criteria includes:
  determining a number of failures of the channel acquisition during the DMTC within the first predetermined time exceeds a failure threshold, and
wherein the detection of the one or more pre-defined recovery criteria includes:
  determining a number of successful channel acquisitions for DRS transmission within the DMTC within the second predetermined time exceeds a success threshold.

23. A method of wireless communication, comprising:
receiving, at a user equipment (UE), radio link monitoring (RLM) configuration information including a set of default RLM resources associated with a connected state of the UE;
monitoring, by the UE, the set of default RLM resources for a default RLM reference signal (RLM-RS) from a serving base station during the connected state;
transmitting, by the UE, a failure report to the serving base station in response to detection of one or more pre-defined failure criteria associated with a failure of the UE to receive the default RLM-RS;
monitoring, by the UE, for one or more pre-defined recovery criteria associated with acceptable link quality between the UE and the serving base station; and
transmitting, by the UE, a recovery report to the serving base station in response to detection of the one or more pre-defined recovery criteria.

24. The method of claim 23, wherein the detection of the one or more pre-defined failure criteria include one or more of:
  identifying a triggered radio link failure (RLF) timer at the UE;
  determining a number of absence of RLM-RS indications received by the UE within a predetermined period of time exceeds a failure threshold; and
  determining a number of consecutive out of synchronization (OOS) indications received by the UE within the predetermined period of time exceeds the failure threshold.

25. The method of claim 23, wherein the detection of the one or more pre-defined recovery criteria include one or more of:
  identifying stoppage of a running radio link failure (RLF) timer at the UE;
  determining a number successful transmission indications received by the UE within a predetermined period of time exceeds a success threshold; and
  determining a number of consecutive in-synchronization (IS) indications received by the UE exceeds the success threshold.

26. The method of claim 23, wherein the RLM configuration information further includes identification of a set of additional RLM resources associated with the one or more pre-defined failure criteria.

27. The method of claim 26, further including:
monitoring, by the UE, the set of additional RLM resources for an additional RLM-RS in response to transmission of the failure report; and
ceasing, by the UE, the monitoring of the set of additional RLM resources in response to transmission of the recovery report.

28. A method of wireless communication, comprising:
transmitting, by a base station, radio link monitoring (RLM) configuration information to one or more served user equipments (UEs), wherein the RLM configuration information includes a set of default RLM resources associated with a connected state of the one or more served UEs;
receiving, by the base station, a failure report from the one or more served UEs, wherein the failure report is associated with a failure of the one or more served UEs to receive a default RLM reference signal (RLM-RS) transmitted by the base station; and
receiving, by the base station, a recovery report from the one or more served UEs, wherein the recovery report is associated with an acceptable link quality between the one or more served UEs and the serving base station.

29. The method of claim 28, further including:
transmitting, by the base station, an additional RLM-RS in response to the failure report, wherein the additional RLM-RS are transmitted within a set of additional RLM resources included within the RLM configuration information transmitted to the one or more served UEs; and
ceasing transmission, by the base station, of the additional RLM-RS in response to the recovery report.

30. The method of claim 28, further including:
adjusting, by the base station, connection parameters with the one or more served UEs based on one or both of the failure report and the recovery report.

* * * * *